US012366343B2

(12) United States Patent
Hartley

(10) Patent No.: US 12,366,343 B2
(45) Date of Patent: Jul. 22, 2025

(54) LIGHTING FIXTURES WITH IMPROVED LIGHTING COMPONENTS

(71) Applicant: Matthew Hartley, Arvada, CO (US)

(72) Inventor: Matthew Hartley, Arvada, CO (US)

(73) Assignee: Matthew Hartley, Arvada, CO (US)

( * ) Notice: Subject to any disclaimer, the term of this patent is extended or adjusted under 35 U.S.C. 154(b) by 0 days.

(21) Appl. No.: 18/493,203

(22) Filed: Oct. 24, 2023

(65) Prior Publication Data

US 2024/0068640 A1 Feb. 29, 2024

Related U.S. Application Data

(63) Continuation of application No. 17/884,380, filed on Aug. 9, 2022, now Pat. No. 11,835,213.

(60) Provisional application No. 63/234,952, filed on Aug. 19, 2021.

(51) Int. Cl.
| | |
|---|---|
| *F21V 3/02* | (2006.01) |
| *B29C 64/118* | (2017.01) |
| *B29C 64/209* | (2017.01) |
| *B29C 64/321* | (2017.01) |
| *B33Y 10/00* | (2015.01) |
| *B33Y 80/00* | (2015.01) |
| *F21V 3/04* | (2018.01) |
| *F21V 11/08* | (2006.01) |
| *B29L 31/00* | (2006.01) |

(52) U.S. Cl.
CPC .............. *F21V 3/02* (2013.01); *B29C 64/118* (2017.08); *B29C 64/209* (2017.08); *B29C 64/321* (2017.08); *B33Y 10/00* (2014.12); *B33Y 80/00* (2014.12); *F21V 3/04* (2013.01); *F21V 11/08* (2013.01); *B29L 2031/7472* (2013.01)

(58) Field of Classification Search
CPC .. F21V 11/08; F21V 11/14; F21V 3/10; F21V 3/04; F21V 3/02
See application file for complete search history.

(56) References Cited

U.S. PATENT DOCUMENTS

| | | | |
|---|---|---|---|
| 7,373,744 B1 | 5/2008 | Wagner | |
| 7,874,705 B2 | 1/2011 | Kenney | |
| 8,721,101 B2 * | 5/2014 | Holten ................. | G02B 6/0073 362/97.3 |

(Continued)

FOREIGN PATENT DOCUMENTS

| | | |
|---|---|---|
| CN | 204300929 U | 4/2015 |
| CN | 204611468 U | 9/2015 |

(Continued)

OTHER PUBLICATIONS

Cardinal IP Services, Patentability Search, dated Oct. 15, 2020, 15 pages.

(Continued)

*Primary Examiner* — Zheng Song
(74) *Attorney, Agent, or Firm* — Quarles & Brady LLP

(57) ABSTRACT

Novel tools and techniques are provided for implementing improved lighting components for a lighting element. A lighting element might include a cover. The cover might include a wall having an outer surface and an inner surface. The cover might further include one or more voids located between the outer surface and the inner surface of the wall. The cover and voids may be formed via one or more three-dimensional ("3D") printing processes.

20 Claims, 17 Drawing Sheets

(56) References Cited

U.S. PATENT DOCUMENTS

| | | | |
|---|---|---|---|
| 8,742,435 | B2 | 6/2014 | Tanaka et al. |
| 9,081,229 | B2* | 7/2015 | Sato ................ G02F 1/133603 |
| 10,016,943 | B2 | 7/2018 | Pettis et al. |
| 10,520,661 | B2 | 12/2019 | Bae et al. |
| 10,724,706 | B2 | 7/2020 | Hikmet et al. |
| 11,378,250 | B2* | 7/2022 | Hikmet ................ F21V 1/22 |
| 2003/0123150 | A1 | 7/2003 | Brickey et al. |
| 2009/0003002 | A1 | 1/2009 | Sato |
| 2009/0073711 | A1* | 3/2009 | Huang ................ F21V 1/26 362/518 |
| 2010/0177535 | A1 | 7/2010 | Sato et al. |
| 2011/0018012 | A1* | 1/2011 | Tanaka ................ F21V 13/02 257/89 |
| 2016/0369993 | A1 | 12/2016 | Hikmet et al. |
| 2017/0009959 | A1* | 1/2017 | Shida ................ H01L 27/1218 |
| 2019/0277475 | A1 | 9/2019 | Hikmet et al. |
| 2019/0390839 | A1 | 12/2019 | Sugiyama et al. |
| 2020/0114572 | A1 | 4/2020 | Hikmet et al. |
| 2020/0198535 | A1* | 6/2020 | Kontani ................ B60Q 3/283 |
| 2021/0033258 | A1 | 2/2021 | Hikmet et al. |
| 2022/0010942 | A1* | 1/2022 | Cornelissen ............ F21V 11/14 |

FOREIGN PATENT DOCUMENTS

| | | |
|---|---|---|
| CN | 204693322 U | 10/2015 |
| CN | 105500975 A | 4/2016 |
| CN | 106439694 A | 2/2017 |
| WO | WO-2003-082550 | 10/2003 |
| WO | WO-2018-077712 | 5/2018 |
| WO | WO-2019-197289 | 10/2019 |

OTHER PUBLICATIONS

Lithophane Lamps, Retrieved on Oct. 14, 2020 from: https://www.behance.net/gallery/65748563/Lithophane-Lamps.

3D Printed Leaf Lamp, Retrieved on Oct. 14, 2020 from: https://www.etsy.com/listing/566816456/leaf-lamp-3d-printed-lamp.

Honeycomb—3D Printed Accent Lamp, Retrieved on Oct. 14, 2020 from: https://www.etsy.com/listing/774287187/honeycomb-3d-printed-accent-lamp.

Non-Final Office Action, U.S. Appl. No. 17/884,380, mailed on Feb. 23, 2023, 21 pages.

Notice of Allowance, U.S. Appl. No. 17/884,380, mailed on Jul. 26, 2023, 25 pages.

* cited by examiner

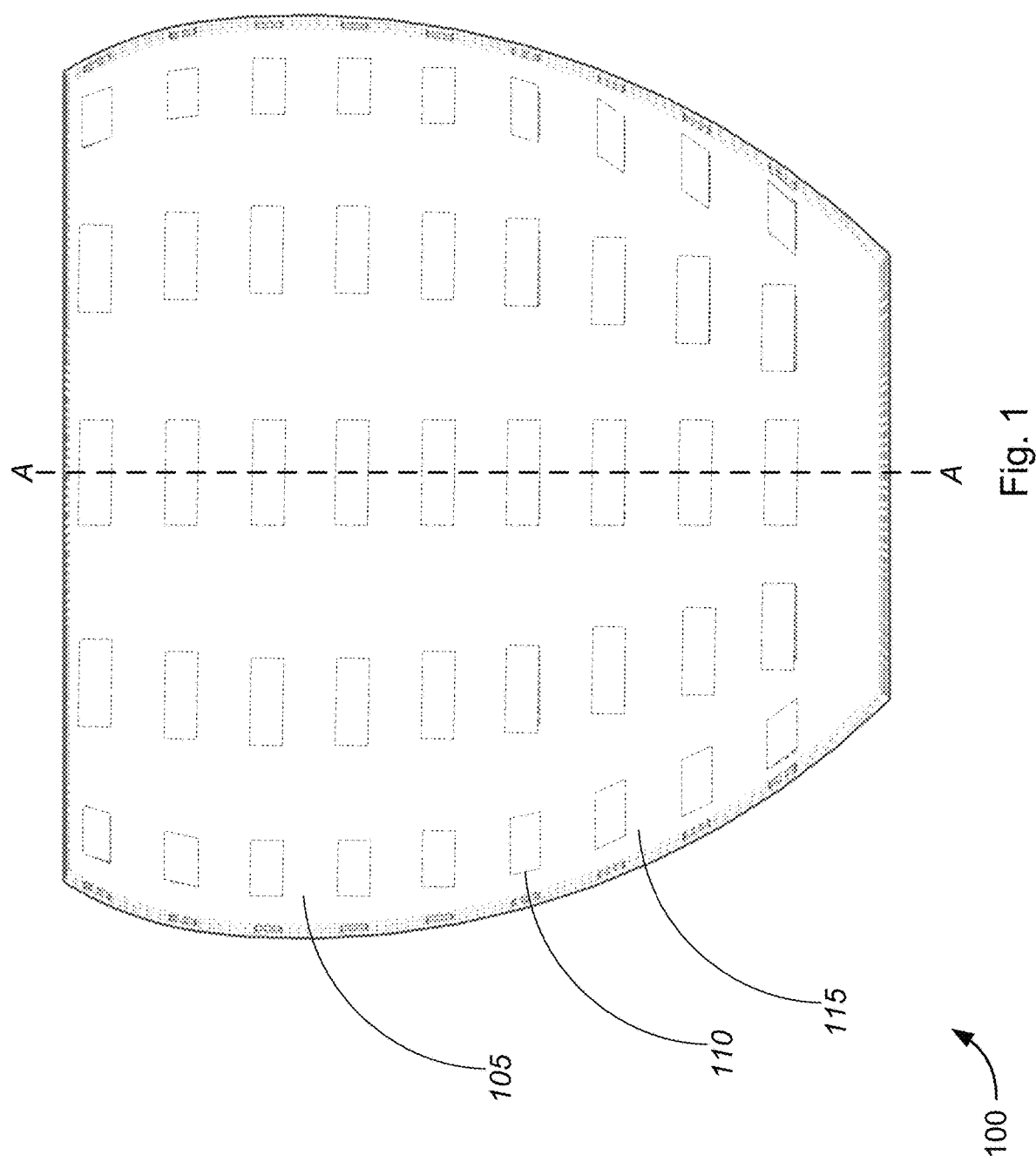

LIGHTING FIXTURES WITH IMPROVED LIGHTING COMPONENTS

CROSS-REFERENCES TO RELATED APPLICATIONS

This application claims priority to U.S. Patent Application Ser. No. 63/234,952 (the "'952 Application"), filed Aug. 19, 2021, by Matthew Hartley, entitled, "Lighting Fixture Method And Apparatus," and to U.S. patent application Ser. No. 17/884,380 (the "'380 Application"), filed Aug. 9, 2022, by Matthew Hartley, entitled, "Lighting Fixtures with Improved Lighting Components," the disclosures of which are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for providing a lighting fixture or a lighting element with improved lighting components.

BACKGROUND

Conventionally, various processes have been used for manufacturing components of lighting fixtures or lighting elements, such as housings, lampshades, reflectors, refractors, connectors, bases, stands, etc. For example, these processes have included shaping metal and casting or molding plastic, glass, or metal to create the components of the light fixture. These processes, however, require lots of material to manufacture the components. This additional material increases the weight of the components, the cost of the components, and the cost to ship or transport the components.

In some cases, injection molding may be used to manufacture the components of lighting fixtures or lighting elements. However, current injection molding manufacturing processes only allow for minor changes to the exterior of the mold so that the component being manufactured can be released from the mold. In some cases, a hollowed-out mold with an open end is required to release the molded component from the die. This limits the design of the components of the lighting fixture, for example, this limits the components to a specific shape and size. In some cases, this also increases the amount of materials being used to create these components. As a result, only limited design options can be achieved with injection molding. Moreover, injection molding tends to restrict the use of multiple different materials to construct a component. This has led to components of a lighting fixture, such as a reflector or refractor, being molded separately and then assembled together as an assembled unit to form the reflector or refractor. This can weaken the strength of the assembled unit and often adds more material, time, and cost.

In order to address one or more issues associated with conventional light fixture manufacturing processes and conventional light fixture components, methods, systems, and apparatuses are provided for implementing a lighting fixture or a lighting element with improved lighting components.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 1 is a schematic diagram illustrating a cover of a lighting element or lighting fixture, in accordance with various embodiments, in accordance with various embodiments;

DETAILED DESCRIPTION OF EMBODIMENTS

Overview

Figure 2A:
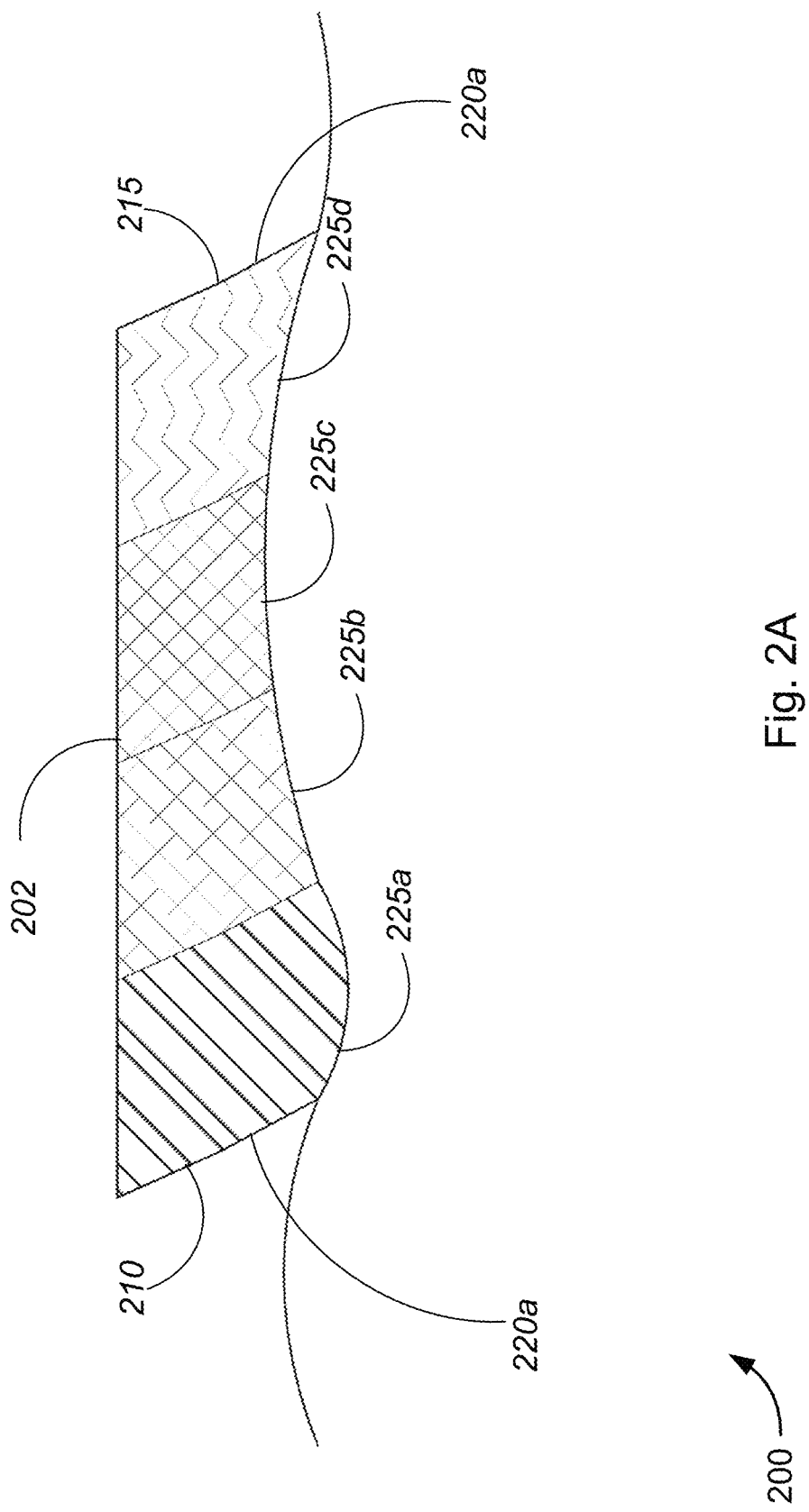
FIGS. 2A-2E (collectively, FIG. 2) are schematic cross-sectional views of a portion of a cover of a lighting element or a lighting fixture as the cover is being formed, in accordance with various embodiments.

Various embodiments set forth an improved components of lighting fixtures or lighting elements and improved methods of manufacturing components of lighting fixtures and lighting elements.

In conventional light fixtures and light fixture manufacturing processes, lots of material is required to manufacture components of the light fixture. Having extra material can increase the manufacturing and shipping cost for the components of the light fixture. Additionally, parts of components often have to be manufactured separately and assembled together to form the components. This can increase the time needed to manufacture and assemble the light fixture components. Further, conventional lighting components are typically limited to a particular size and shape depending on the mold used to create the lighting component. This limits the variety and selection of lighting components available.

The proposed lighting fixture or lighting element provides components of a lighting fixture with less material than traditional lighting fixture. Additionally, the pieces of the components of the lighting fixture may be manufactured as one piece and do not have to be assembled together to form the components. Further, the various components are not limited to a particular size and shape and can be a variety of shapes and sizes.

Additionally, the proposed manufacturing process of the lighting fixture or lighting element may include three-dimensional ("3D") printing. The use of 3D printers can provide a significant advantage over prior manufacturing techniques (e.g., molding) in that less material is required to manufacture a lighting component using a 3D printing process than is necessary to manufacture a similar design that is molded in a die. In accordance with some implementations described below, 3D printing processes also provide significant illumination design advantages for components of a lighting fixture.

In a first aspect, a lighting element is provided. The lighting element might include a lighting element cover. The lighting element cover might include a wall comprising an inner surface, an outer surface attached to the inner surface, and one or more voids located between the inner surface and the outer surface of the wall.

The lighting element might include, without limitation, a light, a lightbulb, a light fixture, a light element, a luminaire, a lamp, a wall light, a night light, and/or any other type of light source, and/or the like. The lighting element cover might be a cover, a shade, or a housing for the lighting element.

In some embodiments, a width, a size, or a shape of the one or more voids may vary. In a non-limiting example, an internal width of the one or more voids varies along at a height of the one or more voids. In various cases, the one or more voids are triangle-shaped, square-shaped, rectangular-shaped, trapezoid-shaped, moon-shaped, or star-shaped, or any other shape. In some cases, an interior of the one or more voids is isolated from an outside environment.

In various instances, at least one inner surface of the one or more voids is formed from at least one of a reflective material, a refractive material, or a self-luminous material, or the at least one inner surface of the one or more voids is coated in the reflective material, the refractive material, or the self-luminous material. Additionally or alternatively, the one or more voids may be filled with at least one of a reflective material, a refractive material, or a self-luminous material. In various other embodiments, at least one inner surface of the one or more voids is formed from a material having a first color or coated in a coating material in the first color, and the first color is different from a wall color of the wall. Additionally or alternatively, the one or more voids may be filled with a material having a first color different from a wall color of the wall. In some instances, the one or more voids may have both a reflective, refractive, or self-luminous material and be a different color from a wall color of the wall.

In some embodiments, the one or more voids comprise one or more structures suspended in the one or more voids. The one or more structures suspended in the one or more voids may be curved, drooped, swooped, etc. In some instances, the one or more suspended structures may be formed from a reflective material, a refractive material, or self-luminous material. In other instances, the one or more structures may be a different color from the one or more voids or from a wall color of the wall. In some cases, the one or more structures may be made from both a reflective material, a refractive material, or self-luminous material and be a different color from the one or more voids and/or from a wall color of the wall.

The lighting element might further include a light source and a connector. The connector might be attached to the lighting element cover and/or the light source. The connector might include a conductive element extending through the connector and configured to provide an electrical connection to the light source. The connector might be configured to provide an electrical connection directly to the light source via the conductive element or indirectly to the light source through one or more intermediary components of the light source connected to the conductive element. In some case, the connector might include a base of the lighting element, a cover of the lighting element, a mount for the lighting element, a suspended mount (e.g., a mount to suspend a lighting element from a ceiling or a wall) for the lighting element, a wall mount for the lighting element, a side fixture of the lighting element, and/or any other connector or component configured to provide an electrical connection to the light source or an intermediary component of the light source. In some cases, the one or more intermediary components might include another light source, a control unit, a power supply, a ballast, a driver, a switch, a wire, and/or one or more other electrical components capable of providing an electrical connection to the light source.

In another aspect, a lighting element might include a light source, a light cover, and a connector. The light source might include a light, a lightbulb, a light emitting diode, a fluorescent light, an incandescent light, a halogen light, and/or the like. The light cover might include a wall comprising an inner surface, an outer surface attached to the inner surface, and one or more voids located between the inner surface and the outer surface of the wall. The connector might be attached to the light cover and the light source. The connector might include a conductive element extending through the connector and configured to provide an electrical connection to the light source. The connector might be configured to provide an electrical connection directly to the light source via the conductive element or indirectly to the light source through one or more intermediary components of the light source connected to the conductive element. In some case, the connector might include a base of the lighting element, a cover of the lighting element, a mount for the lighting element, a suspended mount (e.g., a mount to suspend a lighting element from a ceiling or a wall) for the lighting element, a wall mount for the lighting element, a side fixture of the lighting element, and/or any other connector or component configured to provide an electrical connection to the light source or an intermediary component of the light source. In some cases, the one or more intermediary components might include another light source, a control unit, a power supply, a ballast, a driver, a switch, a wire, and/or one or more other electrical components capable of providing an electrical connection to the light source.

In yet another aspect, a method of manufacturing a lighting element might be provided. The method of manufacturing might include forming a wall of a lighting element cover. Forming the wall of the lighting element cover might comprise forming an inner surface of the wall, forming an outer surface of the wall attached to the inner surface of the wall, and forming one or more voids between the inner surface and the outer surface of the wall.

In some instances, forming the wall might further include forming or depositing, using a three-dimensional ("3D")

printer, a first layer of material, forming or depositing, using the three-dimensional ("3D") printer, one or more additional layers of the material on top of the first layer of the material or a preceding layer of the one or more additional layers, and bypassing, using the 3D printer, forming or depositing the material at one or more locations of the one or more additional layers between the inner surface and the outer surface of the wall.

In some embodiments, a width, a size, or a shape of the one or more voids may vary. In a non-limiting example, an internal width of the one or more voids varies along at a height of the one or more voids. In various cases, the one or more voids are triangle-shaped, square-shaped, rectangular-shaped, trapezoid-shaped, polygon-shaped, circular-shaped, tear-shaped, heart-shaped, moon-shaped, star-shaped, or any other shape or combination of shapes.

In various instances, at least one inner surface of the one or more voids is formed from at least one of a reflective material, a refractive material, or a self-luminous material, or the at least one inner surface of the one or more voids is coated in the reflective material, the refractive material, or the self-luminous material. Additionally or alternatively, the one or more voids may be filled with at least one of a reflective material, a refractive material, or a self-luminous material. In various other embodiments, at least one inner surface of the one or more voids is formed from a material having a first color or coated in a coating material in the first color, and the first color is different from a wall color of the wall. Additionally or alternatively, the one or more voids may be filled with a material having a first color different from a wall color of the wall. In some instances, the one or more voids may have both a reflective material, a refractive material, or a self-luminous material and be a different color from a wall color of the wall.

In some embodiments, the one or more voids comprise one or more structures suspended in the one or more voids. The one or more structures suspended in the one or more voids may be curved, drooped, swooped, etc. In some instances, the one or more suspended structures may be formed from a reflective material, a refractive material, or a self-luminous material. In other instances, the one or more structures may be a different color from the one or more voids or from a wall color of the wall. In some cases, the one or more structures may be made from both a reflective material, a refractive material, or self-luminous material and be a different color from the one or more voids and/or from a wall color of the wall.

Forming the one or more structures suspended in the one or more voids might include forming, using a three-dimensional ("3D") printer, the one or more structures in the one or more voids by increasing an extrusion speed for extruding the one or more structures from the 3D printer as a 3D printer nozzle traverses over the one or more voids or slowing a nozzle speed of the 3D printer nozzle as the 3D printer nozzle traverses over the one or more voids.

In various cases, the method might further include forming a connector attached to the lighting element cover. The connector might include a conductive element extending through the connector and be configured to provide an electrical connection to a light source. The connector might be configured to provide an electrical connection directly to the light source via the conductive element or indirectly to the light source through one or more intermediary components of the light source connected to the conductive element. In some case, the connector might include a base of the lighting element, a cover of the lighting element, a mount for the lighting element, a suspended mount (e.g., a mount to suspend a lighting element from a ceiling or a wall) for the lighting element, a wall mount for the lighting element, a side fixture of the lighting element, and/or any other connector or component configured to provide an electrical connection to the light source or an intermediary component of the light source. In some cases, the one or more intermediary components might include another light source, a control unit, a power supply, a ballast, a driver, a switch, a wire, and/or one or more other electrical components capable of providing an electrical connection to the light source.

Forming the connector might include forming or depositing, using a three-dimensional ("3D") printer, a first layer of material for the connector, forming or depositing, using the 3D printer, one or more additional layers of material on top of the first layer of material or a preceding layer of the one or more additional layers for the connector, and forming or depositing, using the 3D printer, a conductive element in the material of the connector to create the electrical connection.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Similarly, when an element is referred to herein as being "connected," "coupled," or "attached" to another element, it is to be understood that the elements can be directly connected, coupled, or attached to the other element, or have intervening elements present between the elements. In contrast, when an element is referred to as being "directly connected," "directly coupled," or "directly attached" to another element, it should be understood that no intervening elements are present in the "direct" connection between the elements. However, the existence of a direct connection or direct attachment does not exclude other connections or attachments, in which intervening elements may be present.

Likewise, when an element is referred to herein as being a "layer" or "stratum" it is to be understood that the layer or stratum can be a single layer or strata or include multiple layers or strata. When a layer or stratum is described as being coupled or connected to another layer or stratum, it is to be understood that the coupled or connected layers or strata may include intervening elements present between the coupled or connected layers or strata. In contrast, when a layer or stratum is referred to as being "directly" connected or coupled to another layer or stratum, it should be understood that no intervening elements are present between the layers or strata. However, the existence of directly coupled or connected layers or strata does not exclude other connections in which intervening layers or strata may be present.

Additionally, it should be understood that spatial descriptions (e.g., "above," "below," "up," "left," "right," "down," "top," "bottom," "middle," "vertical," "horizontal," etc.) used herein are for purposes of illustration only, and that practical implementations of the structures described herein can be spatially arranged in any orientation or manner.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

SPECIFIC EXEMPLARY EMBODIMENTS

We now turn to the embodiments as illustrated by the drawings. FIGS. 1-9 illustrate some of the features of the method, system, and apparatus for implementing improved lighting components, as referred to above. The methods, systems, and apparatuses illustrated by FIGS. 1-9 refer to examples of different embodiments that include various components and steps, which can be considered alternatives or which can be used in conjunction with one another in the various embodiments. The description of the illustrated methods, systems, and apparatuses shown in FIGS. 1-9 is provided for purposes of illustration and should not be considered to limit the scope of the different embodiments.

With reference to the figures, FIG. 1 is a schematic diagram illustrating a cover 100 of a lighting element or lighting fixture, in accordance with various embodiments. The cover 100 may be a lampshade, a housing for a light, a shade for the light, and/or the like. The cover 100 might be a cover for a lighting element (e.g., a light, a lightbulb, a light fixture, a light element, a luminaire, a lamp, a wall light, a night light, and/or any other type of light source, and/or the like). It should be noted that the various components of cover 100 are schematically illustrated in FIG. 1, and that modifications to the various components and other arrangements of cover 100 may be possible and in accordance with the various embodiments. In addition, although FIGS. 1-7 are described as separate embodiments for ease of description, a person of ordinary skill would understand that various modifications to each embodiment may be applied to other embodiments.

The cover 100 might include a wall 105 and one or more voids 110 (illustrated as dashed lines). The one or more voids 110 might be located between an outer surface 115 of the wall 105 and an inner surface (not shown) of the wall 105 of the cover 100. The outer surface 115 of the wall 105 and the inner surface of the wall 105 might have a smooth surface. Alternatively, in other cases, the outer surface 115 of the wall 105 and an inner surface of the wall 105 might have a rough or bumpy surface. In some cases, the outer wall 105 may be formed from a same material or have a same color as the inner wall. In other cases, the outer wall 105 may be formed from a different material or have a different color than the inner wall.

In some cases, the one or more voids 110 might be invisible, nearly invisible, or imperceptible to a human eye when not illuminated by a light source. However, when illuminated by the light source (not shown in FIG. 1), the one or more voids 110 might be perceptible or visible to the human eye and provide different lighting effects.

In some instances, an interior of the one or more voids 110 may be isolated from an outside environment. In other words, because the one or more voids 110 are located between the outer surface 115 of the wall 105 and the inner surface of the wall 105, the one or more voids 110 might not be exposed to the environment surrounding cover 100. This prevents the collection of dust and debris within the voids 110.

In various embodiments, the size and shape of the one or more voids 110 may vary. Alternatively, in other cases, the one or more voids 110 may be uniform throughout cover 100. In various cases, the one or more voids are triangle-shaped, square-shaped, rectangular-shaped, trapezoid-shaped, polygon-shaped, circular-shaped, tear-shaped, heart-shaped, moon-shaped, star-shaped, or any other shape, or combination of shapes. In some instances, an internal width of the one or more voids 110 may vary. The internal width of the one or more voids 110 may vary in any direction (e.g., along a height, a length, a width, etc.) of the one or more voids 110.

In some cases, an inner surface (not shown) of the one or more voids 110 may be formed from a different material from the cover 100. In a non-limiting example, an inner surface of the one or more voids 110 may be formed from at least one of a reflective material, a refractive material, a self-luminous material, a luminescent material, an electroluminescent material, a glow-in-the-dark material, a combination of these materials, and/or the like. Additionally or alternatively, an inner surface of the one or more voids 110 may be formed from a different color or a combination of different colors from the wall 105. In some cases, an inner surface of the one or more voids 110 may be formed from both a reflective material, a refractive material, a self-luminous material, a luminescent material, an electroluminescent material, a glow-in-the-dark material and a different color material from the wall 105 of the cover 100. Each of these may be used to create a different lighting effect in cover 100.

Alternatively, in other cases, the one or more voids 110 might be filled with a different material from the wall 105. In a non-limiting example, the one or more voids 110 may be filled with at least one of a reflective material, a refractive material, a self-luminous material, a luminescent material, an electroluminescent material, a glow-in-the-dark material. Additionally or alternatively, the one or more voids 110 may be filled with a material that is a different color from the wall 105. In some cases, the one or more voids 110 may be filled with both a reflective material, a refractive material, a self-luminous material, a luminescent material, an electroluminescent material, a glow-in-the-dark material and a different color material from the wall 105 of the cover 100. Each of these may be used to create a different lighting effect in cover 100.

An illustration of how the one or more voids 110 are formed in cover 100 is illustrated below with respect to FIG. 2.

FIGS. 2A-2E (collectively, FIG. 2) are schematic cross-sectional views of a portion of cover 200 (which may be similar to cover 100 of FIG. 1) as the cover 100 is being formed, in accordance with various embodiments. The schematic cross-sectional views of the portion of cover 200 may be cut along line A-A of FIG. 1. In a non-limiting example, FIGS. 2A-2E represent one example of how a void 205 can be created in cover 200. Other ways or methods may also be used to create voids 205. The cover 200 and/or void 205 may be created using a three-dimensional ("3D") printing processes. It should be noted that the cover 200 is schematically illustrated in FIG. 2, and that modifications to the various components and other arrangements of cover 200 may be possible and in accordance with the various embodiments.

The cover 200 of FIG. 2 might be a cover, shade, or housing for a light element or lighting element (e.g., a light, a lightbulb, a light fixture, a luminaire, a lamp, a wall light, a night light, a chandelier, a ceiling light, and/or any other type of light source, and/or the like). The cover 200 might include a wall 202 having an outer wall surface 210 and an inner wall surface 215. The outer wall surface 210 may be attached to the inner wall surface 215. Attached to is defined herein as either directly or indirectly physically connected to, with any number of, or no intervening elements positioned between the outer wall surface 210 and the inner wall surface 215 which are attached to each other. The outer wall surface 210 and the inner wall surface 215 may be curved, angled, straight, or any combination curved, angled, or straight. The outer wall surface 210 and the inner wall surface 215 may also be smooth, bumpy, rough, and/or the like.

The outer wall surface 210 and the inner wall surface 215 may be formed by one or more layers 220 (e.g., layers 220a-220e). Although five layers are shown in FIG. 2, the cover 200 or the portion of the cover 200 might have more or less layers and should not be limited to only those layers shown in FIG. 2. By varying the number of layers 220, a height of the cover 200 might be adjusted.

Each layer 220 might include one or more strata 225 (e.g., strata 225a-225d). In a non-limiting example, each layer 220 might have one or more of an outermost stratum 225a, a second outermost stratum 225b, a second innermost stratum 225c, and an innermost stratum 225d. Although four strata are shown in FIG. 2, the cover 200 of the portion of the cover 200 might have more or less strata and should not be limited to only the strata shown in FIG. 2. By varying the number of strata 225, a thickness of the cover 200 may be adjusted. Additionally, the terms "stratum" and "strata" are used to avoid confusion with other portions of this specification where the term "layer" and "layers" are used. However, the strata 225 may themselves be one or more layers. Different hatching marks are used in FIG. 2 to identify portions of the wall 202 that are of the same stratum.

In some cases, the cover 200 may include one or more voids 205 located between the outer wall surface 210 and the inner wall surface 215. In various instances, the one or more voids 205 may be located between one or more strata 225. In some instances, there may be more than one void 205 across the strata 225. Thus, although only one void 205 is shown in FIG. 2, the cover 200 or a portion of the cover 200 may have more or less voids and should not be limited to the number of voids shown in FIG. 2.

Turning to FIG. 2A, FIG. 2A shows a cross-section of a cover 200 of with a first layer 220a being formed. The first layer 220a may be a base layer or bottom layer of cover 200. When the first layer 220a is a base layer, the first layer 220a may be used to attach the cover 200 to a lighting element, a base of a lighting element, or a light source. Alternatively, the first layer 220a may be located at another location within cover 200. The first layer 220a may be formed or deposited by a 3D printer.

The first layer 220a might be formed from four strata 225a-225d. For purposes of this example, each stratum 225a-225d may be formed or deposited in succession (e.g., first, forming the outermost stratum 225a, second, forming the second outermost stratum 225b, third, forming the second innermost stratum 225c, and fourth, forming the innermost stratum 225d). However, the layers 220 are not limited to formation based on the order listed above and may be formed in any other order. In some cases, the material used by the 3D printer to form each layer 220 and/or stratum 225 may harden before the next deposit sections are laid down.

Figure 2B:
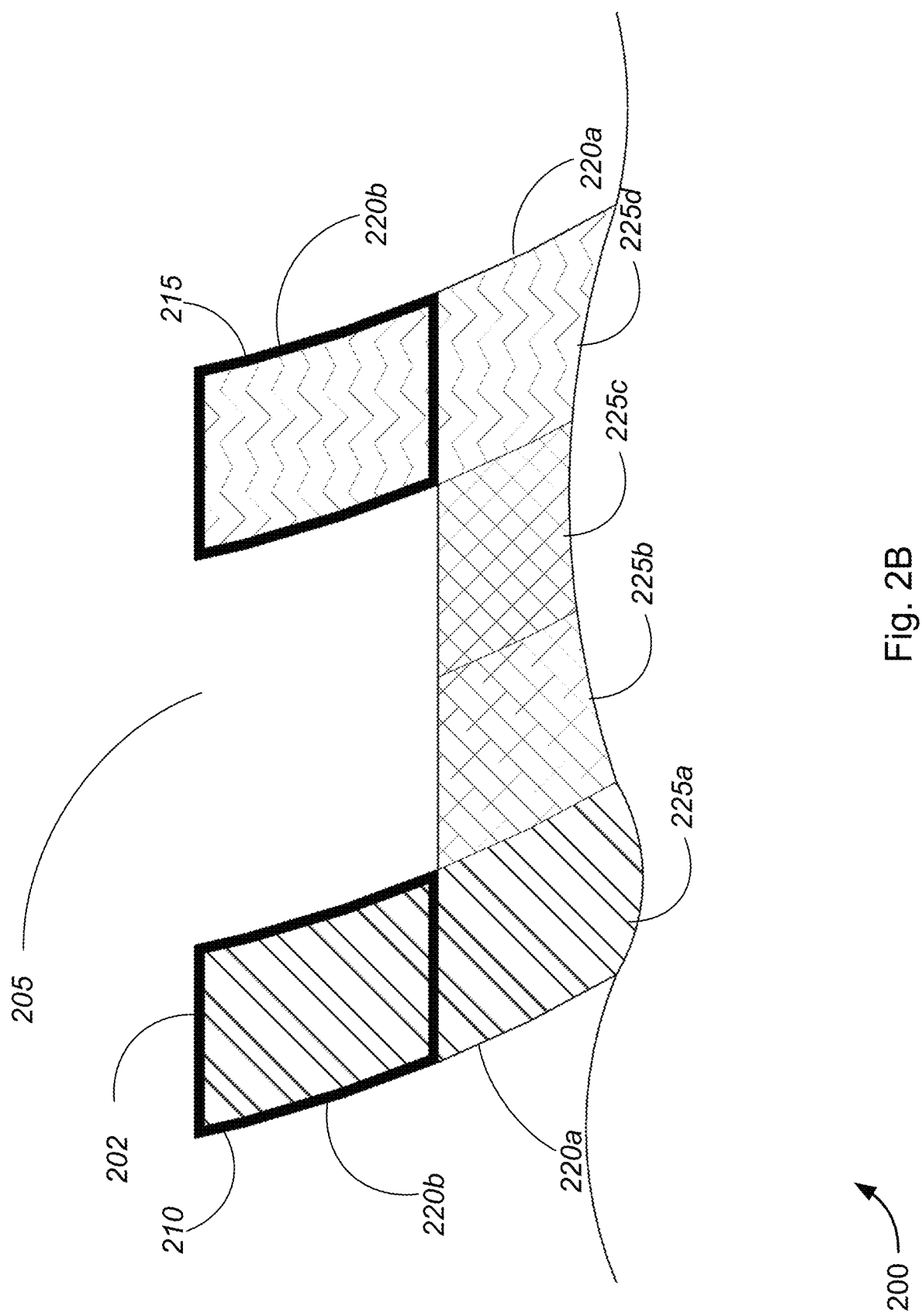

Next, FIG. 2B shows a cross-section of the cover 200 with a second layer 220b or additional layer being formed. The second layer 220b may be formed or deposited on top of the first layer 220a. In some cases, the second layer 220b may be formed or deposited on top of the first layer 220a via a 3D printer.

FIG. 2B also shows the beginning of the formation of void 205 in cover 200. The void 205 may be formed between the outer wall surface 210 and the inner wall surface 215 of wall 202. In a non-limiting example, the void 205 may be formed between the outermost wall stratum 225a and the innermost wall stratum 225d.

In some cases, the void 205 may be created by not forming or depositing any material at one or more selected locations of cover 200. In a non-limiting example, in the second layer 220b, no material has been formed or deposited on top of the second outermost stratum 225b and the second innermost stratum 225c.

Alternatively, in other cases, the void 205 may be created by varying the width of the material deposited on a particular stratum (not shown). In a non-limiting example, the material that is deposited on top of the outermost strata 225a might have a smaller width than the outermost strata 225a. This technique may be used when there are only two strata (e.g., outermost strata 225a and innermost strata 225d), but is not limited to when there are only two strata.

Alternatively, in other cases, the void 205 may be formed using a combination of not depositing material on top of a particular stratum and also varying a width of material that is deposited on a different stratum. In a non-limiting example, in order to form void 205, the material that is deposited on top of the outermost strata 225a might have a smaller width that the outermost strata 225a and no material may be deposited on the second outermost stratum 225b.

Figure 2C:
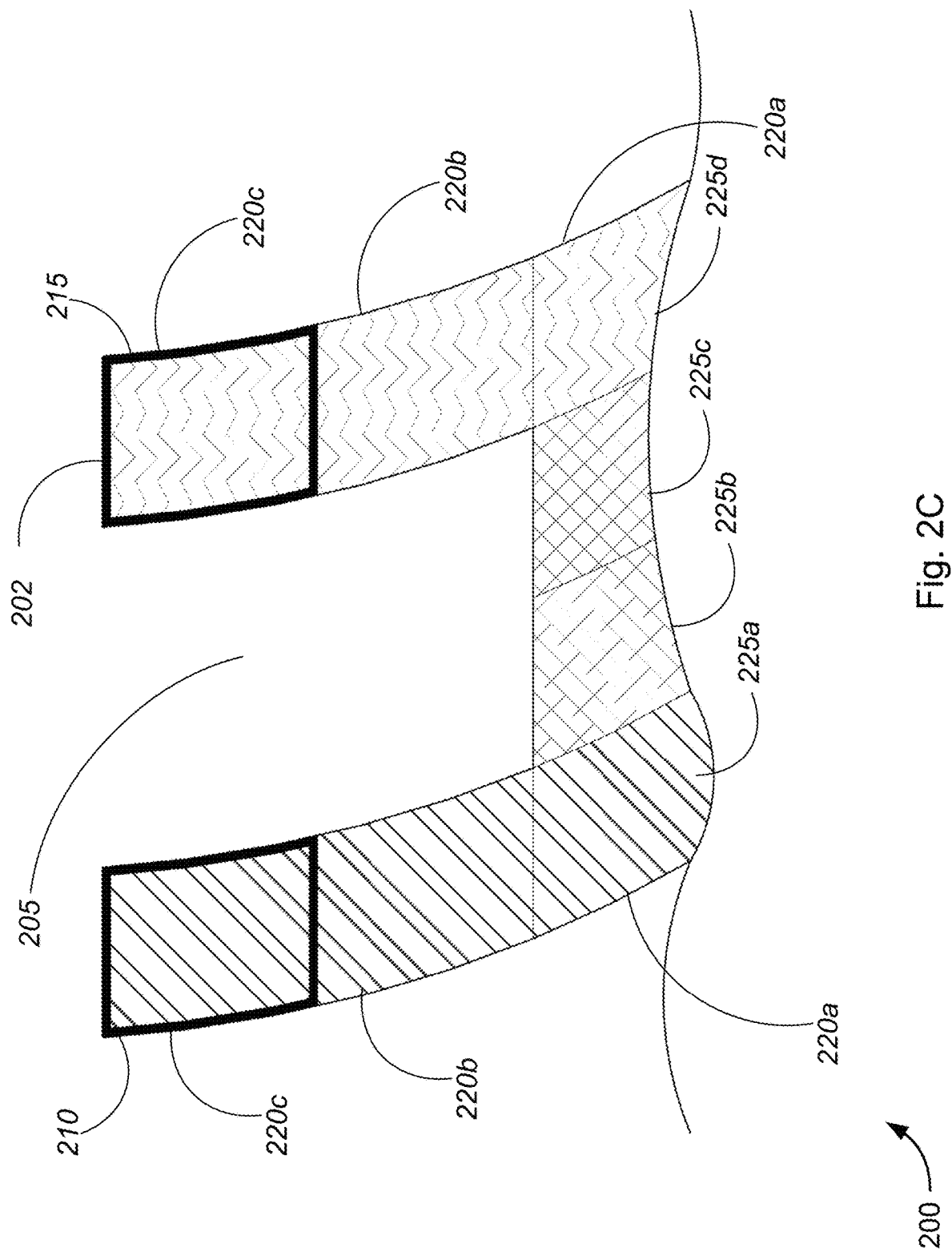

Next, FIG. 2C shows a cross-section of a cover 200 of with a third layer 220c or additional layer being formed. The third layer 220c may be formed or deposited on top of the second layer 220b or preceding layer. In some cases, the third layer 220c may be formed or deposited on top of the second layer 220b via a 3D printer.

FIG. 2C also shows the continuing formation of void 205 in cover 200. The void 205 may be formed between the outer wall surface 210 and the inner wall surface 215 of wall 202. In a non-limiting example, the void 205 may be formed between the outermost wall stratum 225a and the innermost wall stratum 225d. The void 205 may be created by not forming or depositing any material at one or more selected locations of cover 200. In a non-limiting example, in the third layer 220c, no material has been formed or deposited on top of the second outermost stratum 225b and the second innermost stratum 225c.

Figure 2D:
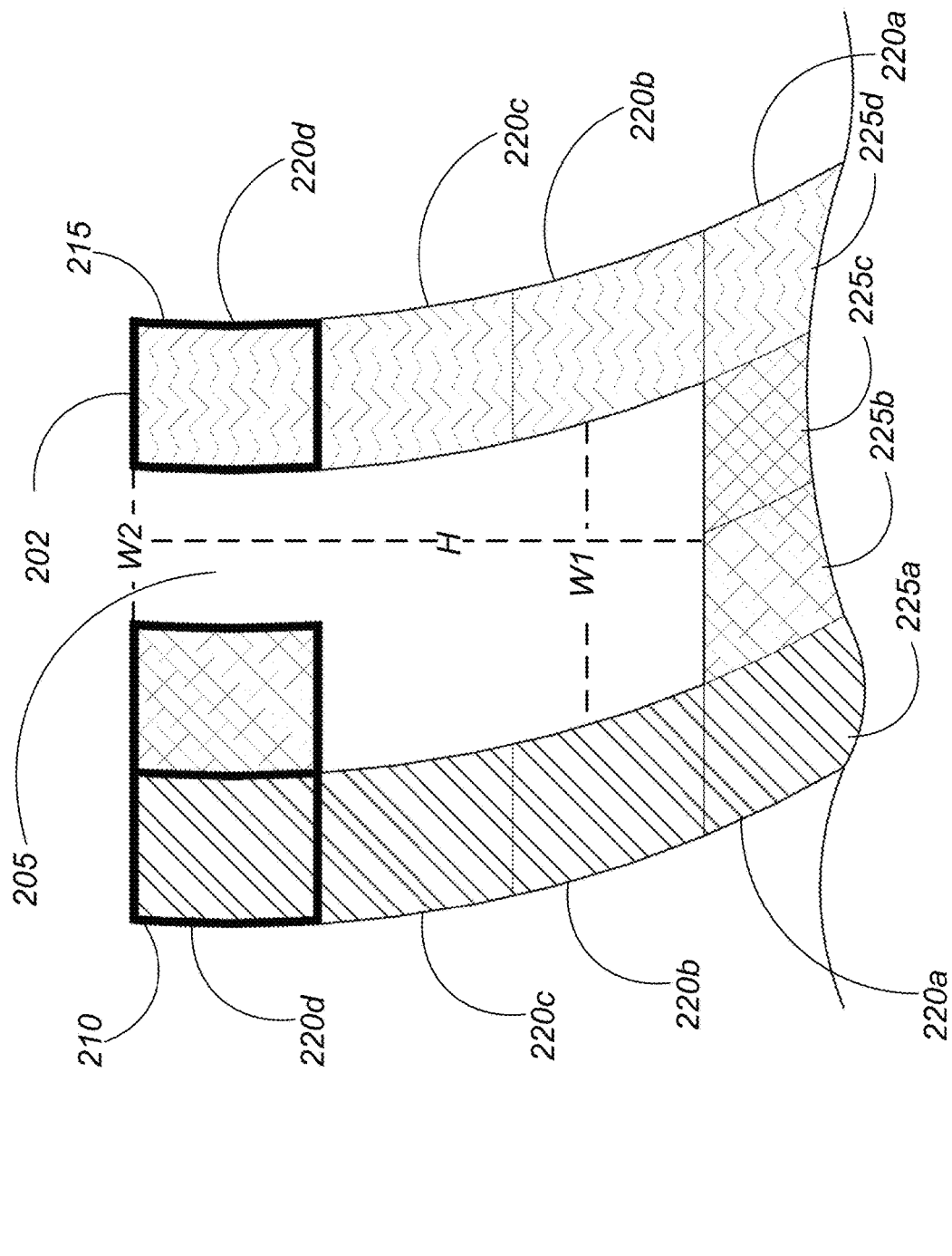

Next, FIG. 2D shows a cross-section of a cover 200 of with a fourth layer 220d or additional layer being formed. The fourth layer 220d may be formed or deposited on top of the third layer 220c or preceding layer. In some cases, the fourth layer 220d may be formed or deposited on top of the third layer 220c via a 3D printer.

FIG. 2D also shows the continuing formation of void 205 in cover 200. The void 205 may be formed between the outer wall surface 210 and the inner wall surface 215 of the wall 202. In a non-limiting example, the void 205 may be formed between the outermost wall stratum 225a and the innermost wall stratum 225d. The void 205 may be created by not forming or depositing any material at one or more selected locations of cover 200. In a non-limiting example, in the fourth layer 220d, no material has been formed or deposited above the second innermost stratum 225c.

However, the fourth layer 220d does have material formed or deposited above the second outermost stratum 225b. In order to form or deposit material above the second outermost stratum 225b, material for the second outermost stratum 225b of the fourth layer 220d is formed or deposited so that the material adheres to the outermost stratum 225a of fourth layer 220d for structural support. Additionally, if the void 205 does not extend around an entire circumference or perimeter of the cover 200, the second outermost stratum 225b of the fourth layer 220d might further be supported by portions of the second outermost wall stratum 225b that are in front of or behind the void 205 of the second outermost stratum 225b of the fourth layer 220d.

Figure 3:
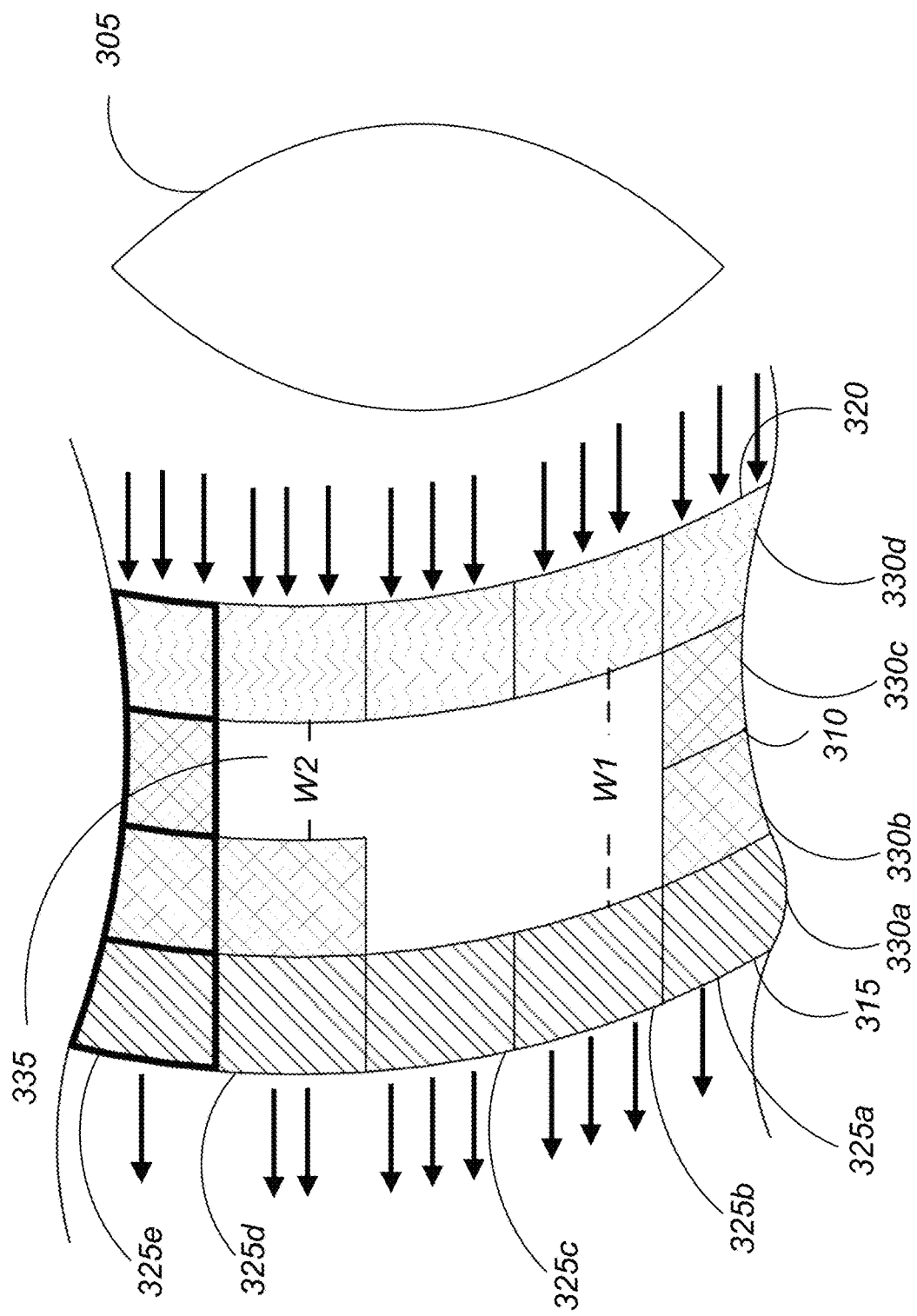
FIG. 3 is a schematic cross-sectional view of a portion of a lighting element with a light source and a cover, in accordance with various embodiments.

In some cases, as shown in FIG. 2D, a thickness or a width ("W1" and "W2") of the void 205 may vary along a height ("H") of the void 205 as the one or more layers 220 are being deposited. For example, the void 205 has a first width W1 and a second width W2. By varying the width of the void 205, different lighting effects may be created (as shown in FIG. 3). The width of the void 205 may be varied in a few different ways. In a non-limiting example, the width of the void 205 may be varied by not depositing material on a particular strata (e.g., second outermost strata 225b and/or second innermost strata 225c). Alternatively, the width of the void 205 may be varied by varying the size or width of the material that is deposited (not shown). In a non-limiting example, the material that is deposited on top of the second outermost strata 225b might have a smaller width that the second outermost strata 225b. Alternatively, in other cases, the width of the void 205 may be varied by varying the width of a strata 225 (e.g., by making the second outermost strata 225b wider than the outermost strata 225a). Alternatively, in other cases, the width of the void 205 may be a constant width. Although FIG. 2D shows the width of the void 205 varying along the height of the void 205, the thickness or width of the void 205 may also be configured to vary along a length or a width of the void 205.

Figure 2E:
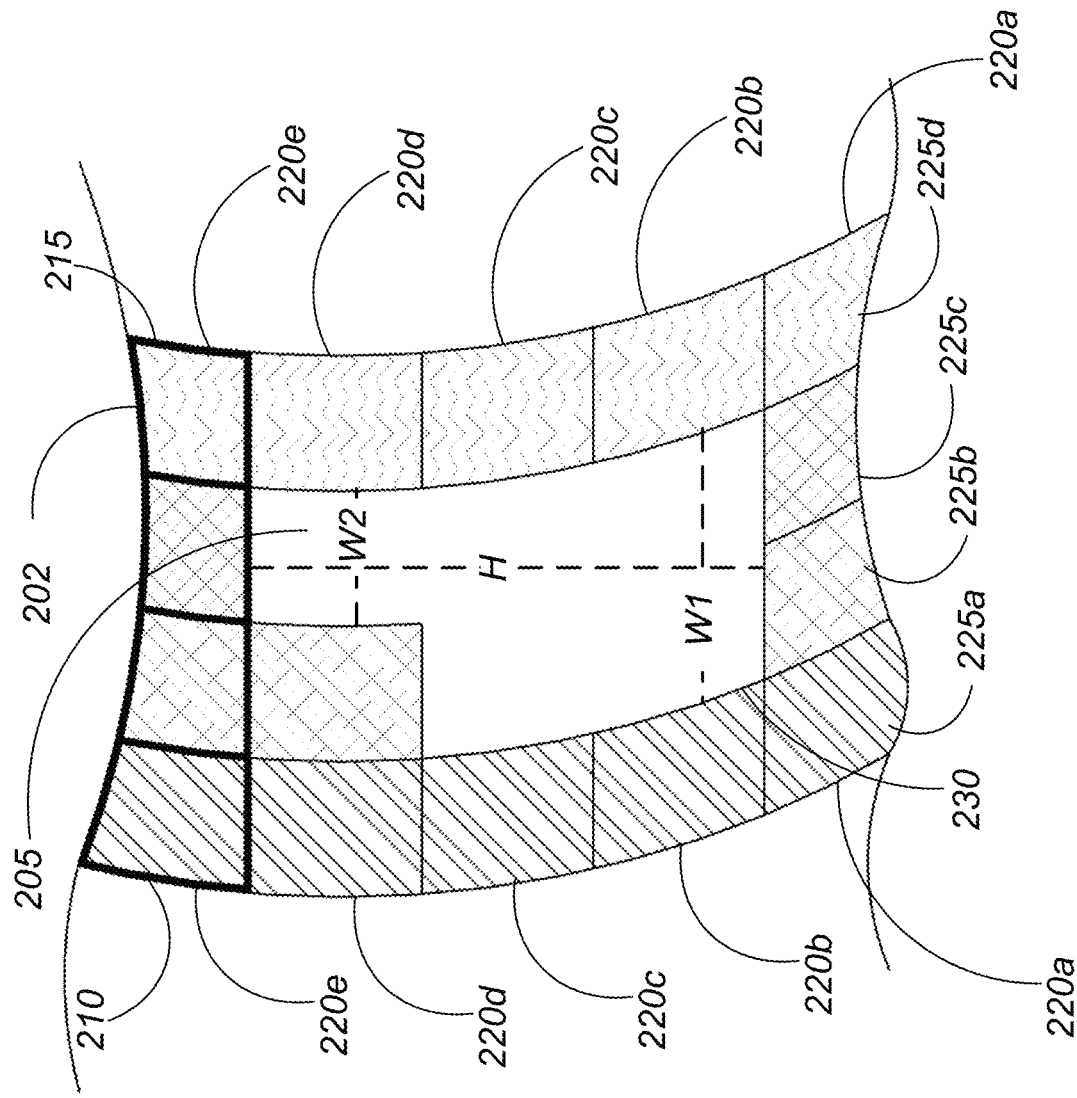

Next, FIG. 2E shows a cross-section of a cover 200 of with a fifth layer 220e or additional layer being formed. The fifth layer 220e may be formed or deposited on top of the fourth layer 220d or preceding layer. In some cases, the fifth layer 220e may be formed or deposited on top of the fourth layer 220d via a 3D printer.

FIG. 2E also shows the completed formation of void 205 in wall 202 of the cover 200. The completed void 205 may be located anywhere in cover 200 and is not limited a particular location within cover 200. The void 205 may be formed between the outer wall surface 210 and the inner wall surface 215 of wall 202. In a non-limiting example, the void 205 may be formed between the outermost wall stratum 225a and the innermost wall stratum 225d. In order to complete the void 205, a final layer of material (e.g., fifth layer 220e) may be deposited to cover or fully enclose the void 205 in cover 200 between the outer wall surface 210 and the inner wall surface 215 of wall 202.

In order to form or deposit material above the second innermost stratum 225c and fully enclose the void 205, material for the second innermost stratum 225c of the fifth layer 220e is formed or deposited so that the material adheres to the second outermost stratum 225b and the innermost stratum 225d of layer 220e for structural support. Additionally, if the void 205 does not extend around an entire circumference or perimeter of the cover 200, the second innermost stratum 225c of the fifth layer 220e might further be supported by portions of the second innermost wall stratum 225c that are in front of or behind the void 205 of the second innermost stratum 225c of the fifth layer 220e.

By enclosing the void 205 in the cover 200 between the outer wall surface 210 and the inner wall surface 215, several advantages may be realized. For example, different lighting effects may be achieved using the void 205. Additionally, fully enclosing the void 205 within wall 202 isolates the void 205 from the outside environment and prevents dust, debris, and/or dirt from collecting within the void 205. Thus, an interior surface of the void 205 does not need to be cleaned. Further, by enclosing the void 205 within an interior of the cover 200, a surface of outer wall surface 210 and a surface of the inner wall surface 215 may be generally smooth making the surfaces of the outer wall surface 210 and the inner wall surface 215 easier to clean.

In various instances, at least one inner surface 230 of the one or more voids 205 may be formed from at least one of a reflective material, a refractive material, a self-luminous material, a luminescent material, an electroluminescent material, a glow-in-the-dark material, and/or the like. In some cases, a 3D printer may print the interior surface 230 of the one or more voids 205 in at least one of a reflective material, a refractive material, a self-luminous material, a luminescent material, an electroluminescent material, a glow-in-the-dark material, and/or the like. In other cases, the interior surface 230 might be coated in the reflective material, the refractive material, the self-luminous material, the luminescent material, the electroluminescent material, a glow-in-the-dark material, and/or the like. The reflective material, the refractive material, the self-luminous material, the luminescent material, the electroluminescent material, a glow-in-the-dark material, and/or the like might include ink, paint, or other thin layers of material having reflective, refractive, self-luminous, luminescent, electroluminescent, or glow-in-the-dark properties. The coating may occur by spraying, painting, covering, or printing material on the interior surface 230 of the void 205. Additionally or alternatively, the one or more voids 205 may be filled with at least one of a reflective material, a refractive material, a self-luminous material, a luminescent material, an electroluminescent material, a glow-in-the-dark material, and/or the like.

In various other embodiments, at least one inner surface 230 of the one or more voids 205 is formed from a material having a first color or coated in a coating material in the first color. The coating material may be ink, paint, thin layers of material, and/or the like. The coating may occur by spraying, painting, covering, or printing the coating material on the interior surface 230 of the void 205. The first color is different from a wall color of the wall 202. Additionally or alternatively, the one or more voids 205 may be filled with a material having a first color different from a wall color of the wall 202. In some instances, the one or more voids 205 may have both a reflective, refractive, a self-luminous material, a luminescent material, an electroluminescent material, a glow-in-the-dark material, and/or the like and be a different color from a wall color of the wall 202.

In various cases, the one or more voids 205 are triangle-shaped, square-shaped, rectangular-shaped, trapezoid-shaped, moon-shaped, or star-shaped, or any other shape.

Other functions or features of the cover 200 are described below with respect to FIGS. 3-7.

FIG. 3 is a schematic cross-sectional view of a portion of a lighting element or light element 300 with a light source 305 and cover 310 (which may be similar to cover 100 of FIG. 1 or cover 200 of FIG. 2), in accordance with various embodiments. In a non-limiting example, FIG. 3 represent an example of how one or more voids 335 of cover 310 can be used to create different lighting effects (shown via the arrows of FIG. 3). The cover 310 and/or void 335 may be created using 3D printing processes. It should be noted that the cover lighting element 300 is schematically illustrated in FIG. 3, and that modifications to the various components and other arrangements of lighting element 300 may be possible and in accordance with the various embodiments.

The lighting element 300 might be a light, a lightbulb, a light fixture, a light element, a luminaire, a lamp, a wall light, a night light, and/or any other type of light source, and/or the like. The lighting element 300 might include a light source 305 which might be a light, a lightbulb, a light emitting diode, a fluorescent light, an incandescent light, a halogen light, and/or the like.

The lighting element 300 might further include a cover 310. The cover 310 might be a housing or a shade (e.g., lampshade) for a light source 305. The cover 310 might include an outer wall surface 315 and an inner wall surface 320. The outer wall surface 210 and the inner wall surface 215 may be curved, angled, straight, or any combination curved, angled, or straight. The outer wall surface 315 and the inner wall surface 320 might be formed from one or more layers 325a-325e (collectively, layers 325). Although only five layers are shown in FIG. 3, there may be more or less layers that form the outer wall surface 315 and an inner wall surface 320 of cover 310.

Each layer 325 might include one or more strata 330 (e.g., strata 330a-330d). In a non-limiting example, each layer 325 might have one or more of an outermost stratum 330a, a second outermost stratum 330b, a second innermost stratum 330c, and an innermost stratum 330d. Although four strata are shown in FIG. 3, the cover 310 or the portion of the cover 310 might have more or less strata and should not be limited to only the strata shown in FIG. 3. By varying the number of strata 330 or a thickness of the strata 330, a thickness of the cover 310 may be adjusted. Additionally, the terms "stratum" and "strata" are used to avoid confusion with other portions of this specification where the term "layer" and "layers" are used. However, the strata 330 may themselves be one or more layers. Different hatching marks are used in FIG. 3 to identify portions of the cover 310 that are of the same strata.

The cover 310 might further include one or more voids 335 located between the outer wall surface 315 and the inner wall surface 320.

The one or more voids 335 might be provided in the cover 310 to provide different lighting effects (e.g., different light filtering effects). In some cases, a width (e.g., W1 and W2) of the void 335 may also vary to provide different lighting effects (e.g., different light filtering effects).

The one or more arrows shown in FIG. 3 represent an amount of light being produced by the light source 305 and filtered through the cover 310. As shown in layers 325a and 325e, the cover 310 has four strata 330a-330d and no voids which allows a first amount of light to pass through layers 325a and 325e. As shown in layers 325b and 325c, the cover 310 has two strata 330a and 330d and a portion of void 335 which allows a second amount of light (different from the first amount of light) to pass through layers 325b and 325c. In this case, the amount of light passing through layers 325b and 325c might be more than the amount of light passing through layers 325a and 325e. As shown in layer 325d, the cover 310 has three strata 330a, 330b, and 330d and a portion of void 335 which allows a third amount of light (different from the first amount of light and the second amount of light) to pass through layers 325b and 325c. In this case, the amount of light passing through layer 325d might be more than the amount of light passing through layers 325a and 325e, but less than the amount of light passing through layers 325b and 325c.

Thus, forming one or more voids 335 within cover 310 provides different lighting effects within cover 310. The voids 335 allow a contrast to be made on a surface of the outer wall surface 315 when a light source is energized in juxtaposition to the inner wall surface 320 creating an even distribution of light on the surface of the inner wall surface 320. Additionally, when the light source is off and not producing light, the voids 335 may be invisible, imperceptible, or nearly invisible to the human eye.

Other functions or features of the lighting element 300 are described below with respect to FIGS. 4-7.

Figure 4A:
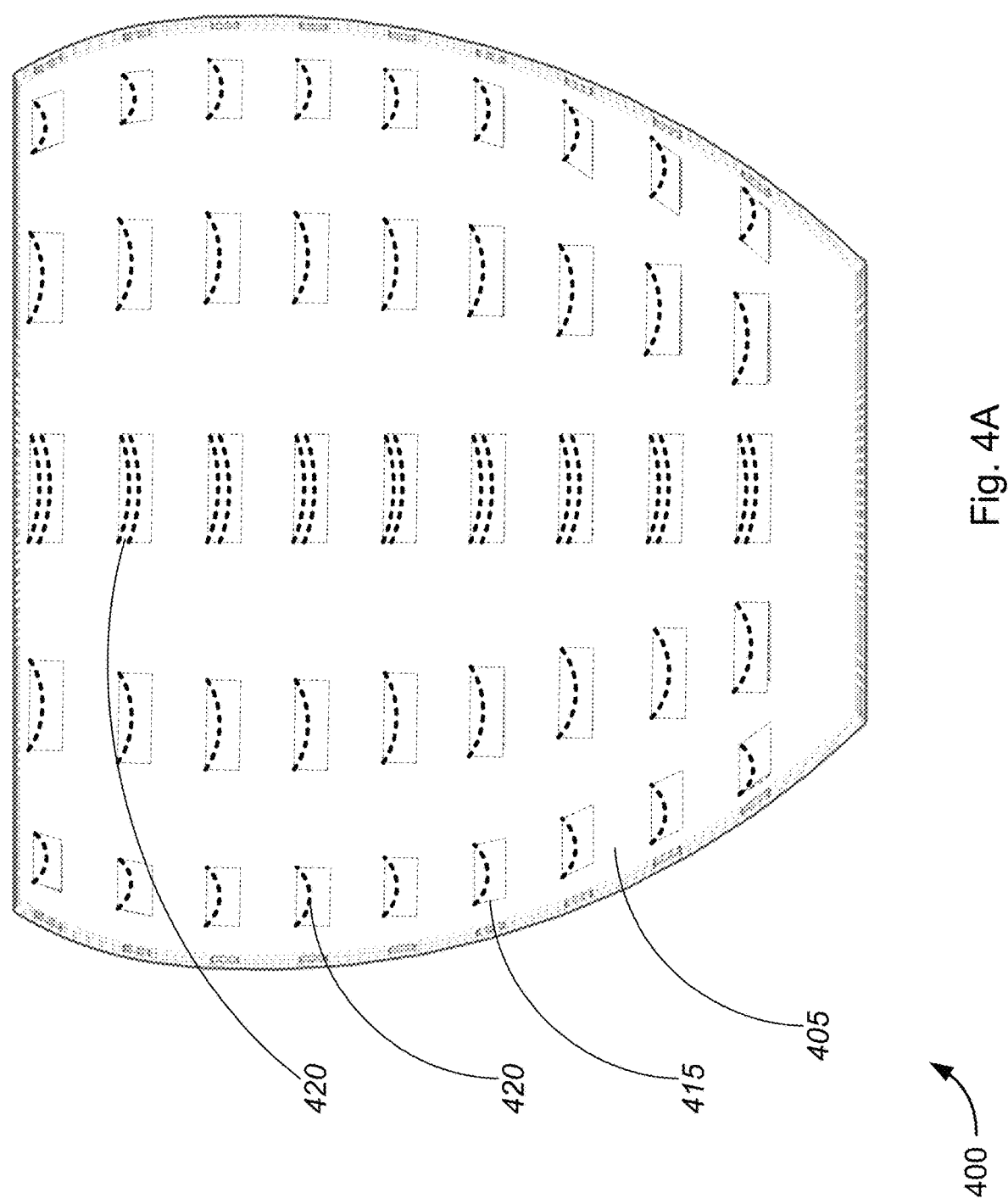
FIGS. 4A and 4B (collectively, FIG. 4) are schematic diagrams illustrating another cover of a lighting element or a lighting fixture, in accordance with various embodiments.
Figure 4B:
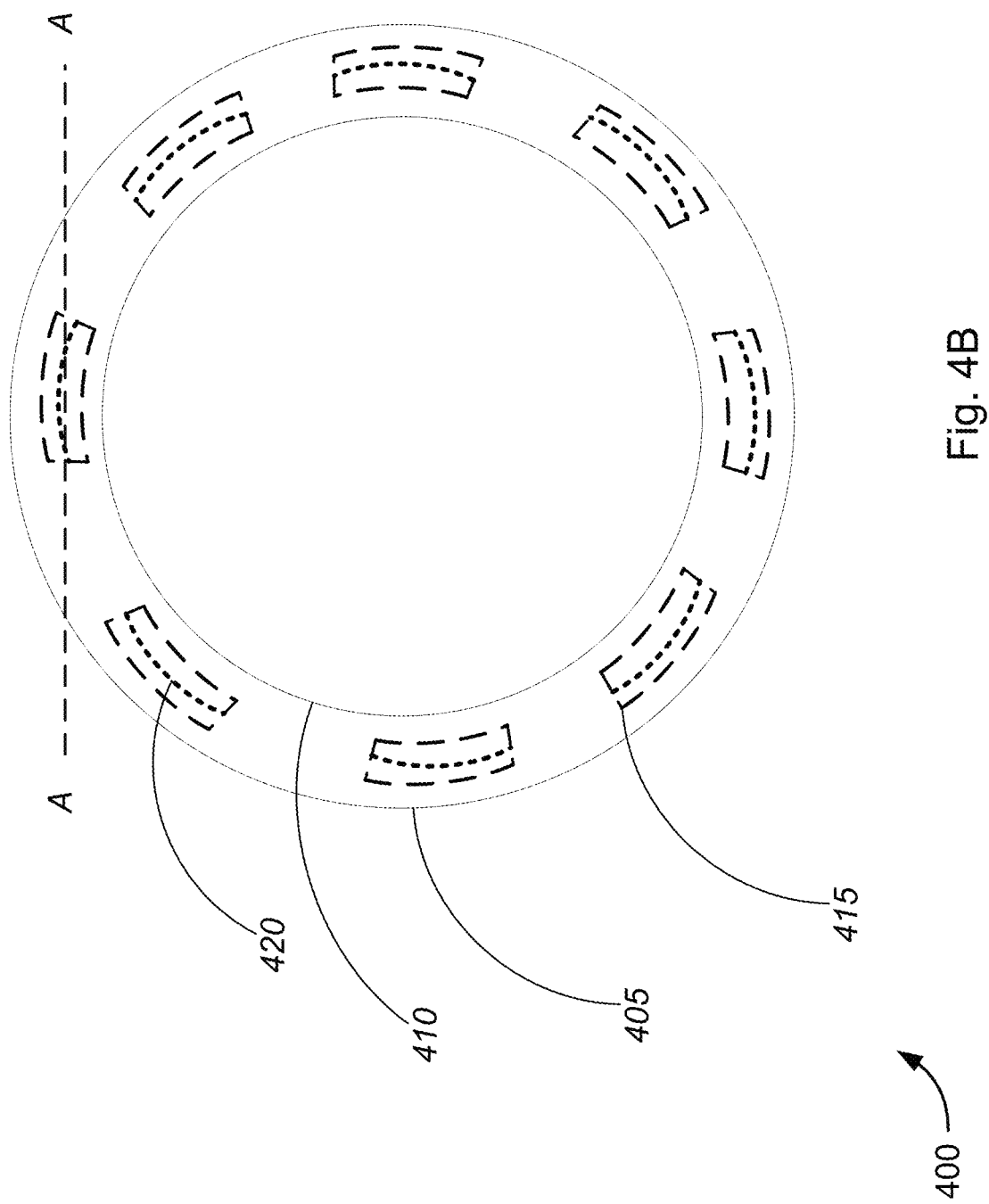

FIG. 4 is another schematic diagram illustrating a cover 400 of a lighting element, in accordance with various embodiments. FIG. 4A represents a front view of cover 400 while FIG. 4B represents a top view of cover 400. The cover 400 may be similar to the cover 100 of FIG. 1, the cover 200 of FIG. 2, and/or the cover 310 of FIG. 3. The cover 400 might be a lampshade, a housing for a light, and/or the like. The cover 400 might be a cover for a light element (e.g., a light, a lightbulb, a light fixture, a lighting element, a luminaire, a lamp, a wall light, a night light, and/or any other type of light source, and/or the like). It should be noted that the various components of cover 400 are schematically illustrated in FIG. 4, and that modifications to the various components and other arrangements of cover 400 may be possible and in accordance with the various embodiments.

The cover 400 might have an outer wall surface 405 and an inner wall surface 410. Additionally, the cover 400 might further include one or more voids 415 (illustrated as dashed lines).

The one or more voids 415 might be located between the outer wall surface 405 and the inner wall surface 410 of the cover 400. In some cases, the one or more voids 415 might be invisible or nearly invisible to a human eye when not illuminated by a light source. However, when illuminated by the light source (not shown in FIG. 4), the one or more voids 415 might provide different lighting effects. In some cases, the one or more voids 415 might also include one or more structures 420 suspended within the voids 415. The one or more structures 420 might be one or more pieces of material or filament or one or more lines of material or filament suspended in the one or more voids 415. The one or more structures 420 might include one or more droops, one or more swoops, one or more curves, one or more drapes, and/or the like.

An illustration of the one or more structures 420 suspended in the one or more voids 415 are described below with respect to FIG. 5.

Figure 5A:
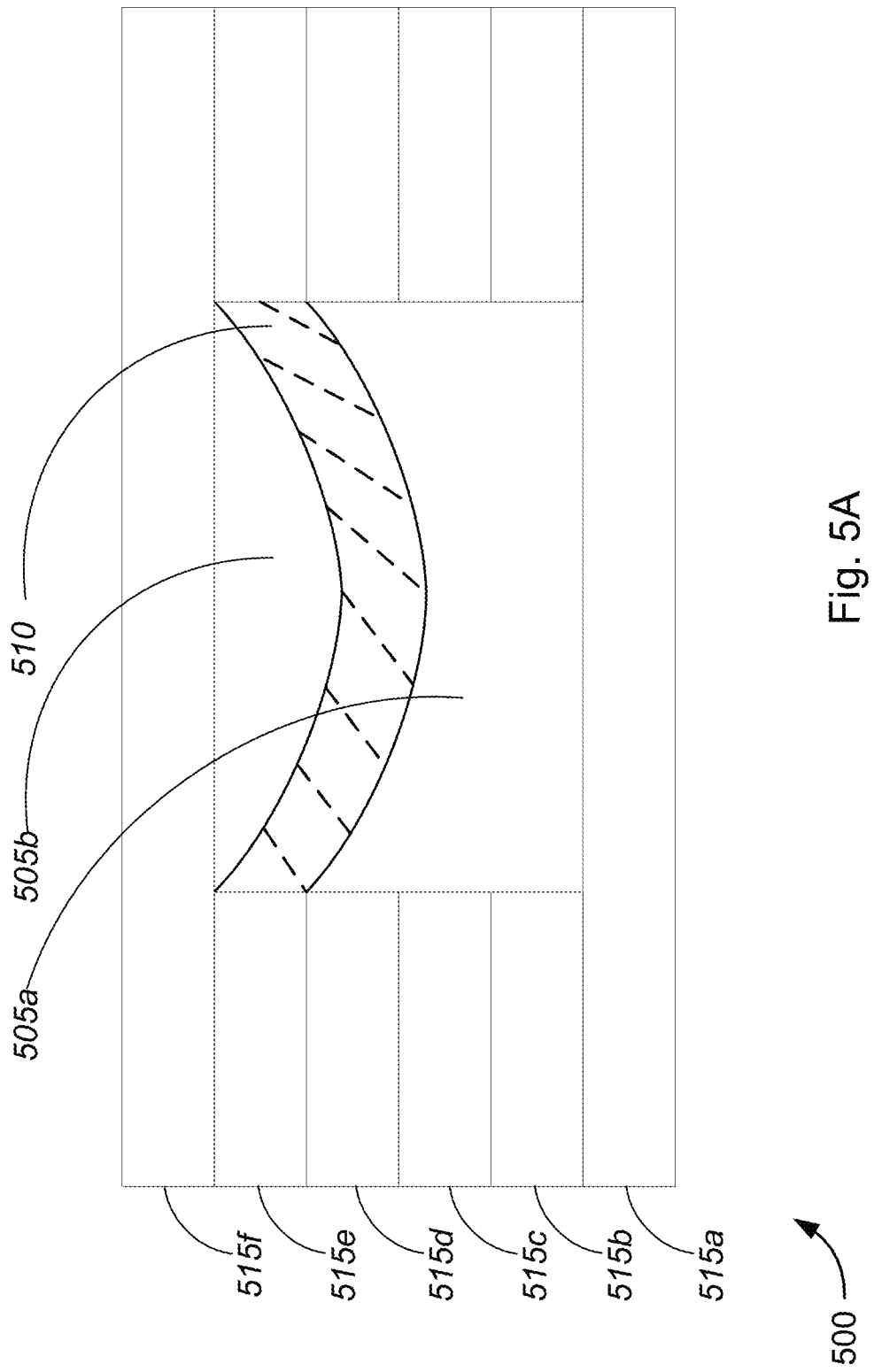
FIGS. 5A and 5B (collectively, FIG. 5) are schematic cross-sectional views of a portion of a portion of a cover of a lighting element or a lighting fixture, in accordance with various embodiments.
Figure 5B:
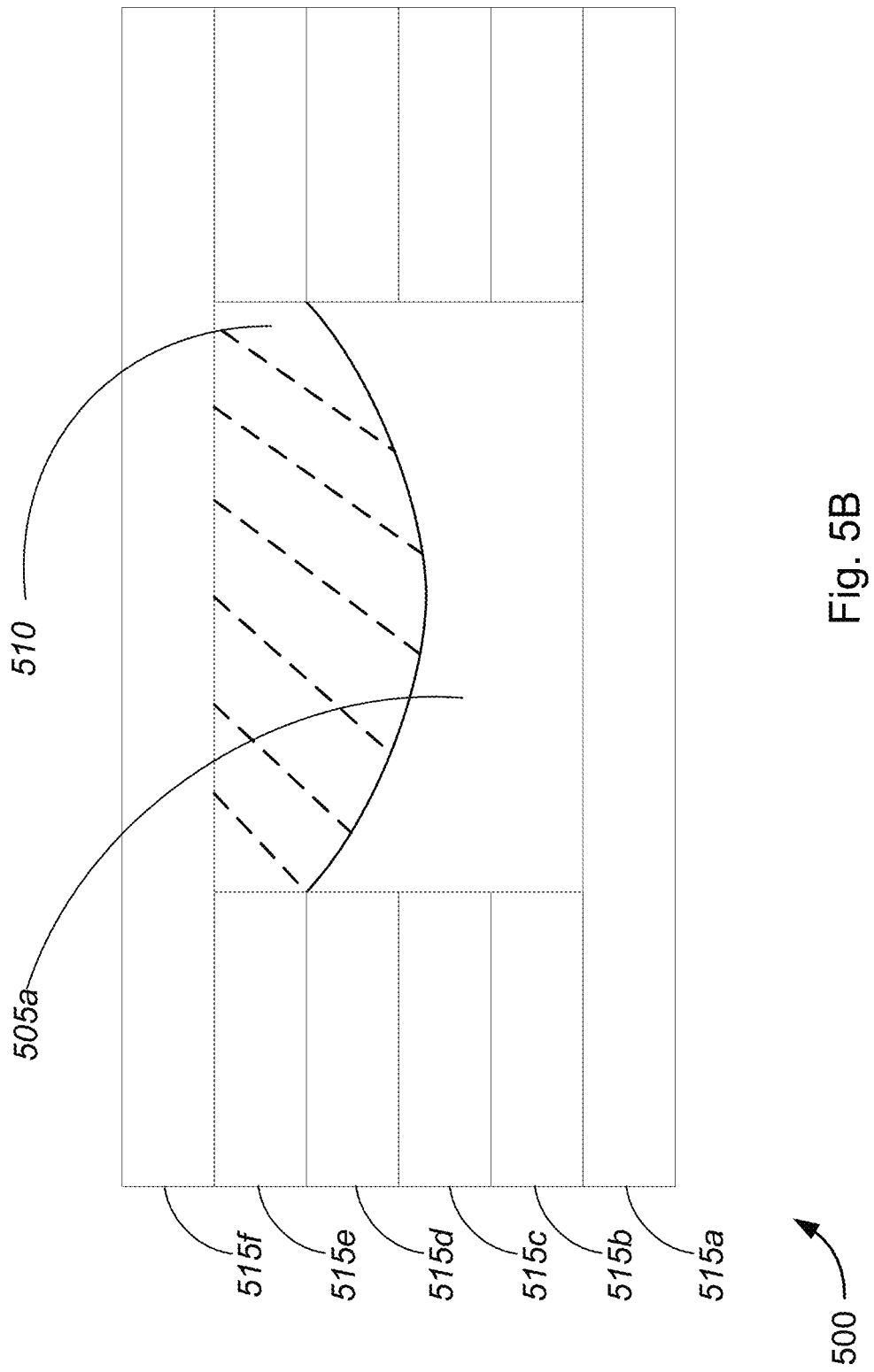

FIGS. 5A and 5B (collectively, FIG. 5) are schematic cross-sectional views of a portion of cover 500 (which may be similar to cover 100 of FIG. 1, the cover 200 of FIG. 2, the cover 310 of FIG. 3, and/or the cover 400 of FIG. 4), in accordance with various embodiments. The schematic cross-sectional view of the portion of cover 500 may be cut along line A-A of FIG. 4. In a non-limiting example, FIG. 5 represents an example of how one or more structures 510 may be suspended within void 505 in cover 500. The cover 500, void 505, and/or one or more structures 510 may be created using 3D printing processes. It should be noted that the cover 500 is schematically illustrated in FIG. 5, and that modifications to the various components and other arrangements of cover 500 may be possible and in accordance with the various embodiments.

The cover 500 of FIG. 5 might be a cover or shade for a light element or lighting element (e.g., a light, a lightbulb, a light fixture, a luminaire, a lamp, a wall light, a night light, and/or any other type of light source, and/or the like).

The cover 500 may be formed by one or more layers 515 (e.g., layers 515a-515f). Although six layers are shown in FIG. 5, the cover 500 or the portion of the cover 500 might have more or less layers and should not be limited to only those layers shown in FIG. 5.

In some cases, the cover 500 may include one or more voids 505 (e.g., voids 505a and 505b). The one or more voids 505 may have one or more structures 510 suspended in the one or more voids 505. The one or more structures 510 might be one or more droops of material, one or more swoops of material, one or more curves of material, one or more drapes of material, one or more pieces of hanging material, one or more shapes of material, or any other shape or orientation of material capable of being suspended on the one or more voids 505, and/or the like. The one or more structures 510 suspended in the one or more voids 505 might be suspended in any direction (e.g., along a length (as shown), along a height, or along a width of the void 205). Additionally and/or alternatively, the one or more structures 510 might be formed from at least one of a reflective material, a refractive material, a self-luminous material, a luminescent material, an electroluminescent material, a glow-in-the-dark material, a colored material different from the material of the cover 500 or void 505, and/or the like to create one or more different lighting effects.

Creating the one or more pieces of suspended material 510 within the voids 505 may be achieved via 3D printing. The 3D printer may form or deposit one or more layers 515 of material (e.g., plastic, metal, and/or the like). As the one or more layers 515 of material are being deposited or formed, a void 505 may also be created by bypassing depositing material in different portions of the cover 500. In areas where the one or more voids 505 are formed, the one or more structures 510 may be suspended in the voids 505. The one or more structures 510 may be created by altering the speed and/or extrusion rates of the 3D printer as the nozzle of the 3D printer reaches an edge of the voids 505. In a non-limiting example, the speed of the nozzle may slowed and/or the speed of extrusion for extruding the material may be increased to create the one or more structures 510.

The drooping curves of the one or more structures 510 can vary in degree. Additionally, there may only be one piece of material 510 suspend in a void 505. Alternatively, there may be more than one piece of material suspended in void 505. In some cases, a first void 505a may be formed below the one or more structures 510 and a second void 505b might be created above the one or more structures 510 (as shown in FIG. 5A). Alternatively, only one void 505 may be created below the one or more structures 510 (as shown in FIG. 5B).

The one or more structures 510 can create different lighting effects. For example, when one or more structures 510 are suspended within void 505, the one or more structures 510 can alter the pattern within the cover 500 creating an illuminating effect. In some cases, the surface on the exterior and the interior of the cover 500 may appear to be uniform and the voids 505 and one or more structures 510 may not be perceptible to a human eye. However, when the light source is activated, the pattern of the one or more structures 510 may be visible.

Other components of a lighting element are described below with respect to FIGS. 6 and 7.

Figure 6A:
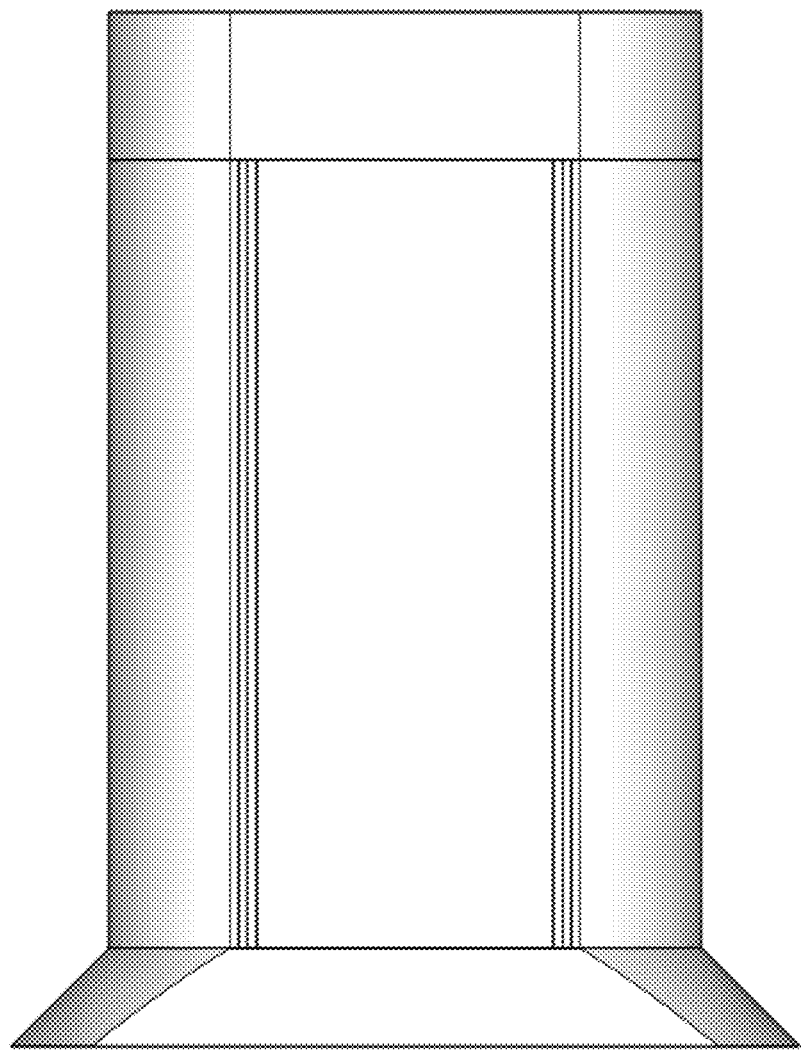
FIGS. 6A-6C (collectively, FIG. 6) are schematic diagram of a connector of a lighting element, in accordance with various embodiments.
Figure 6B:
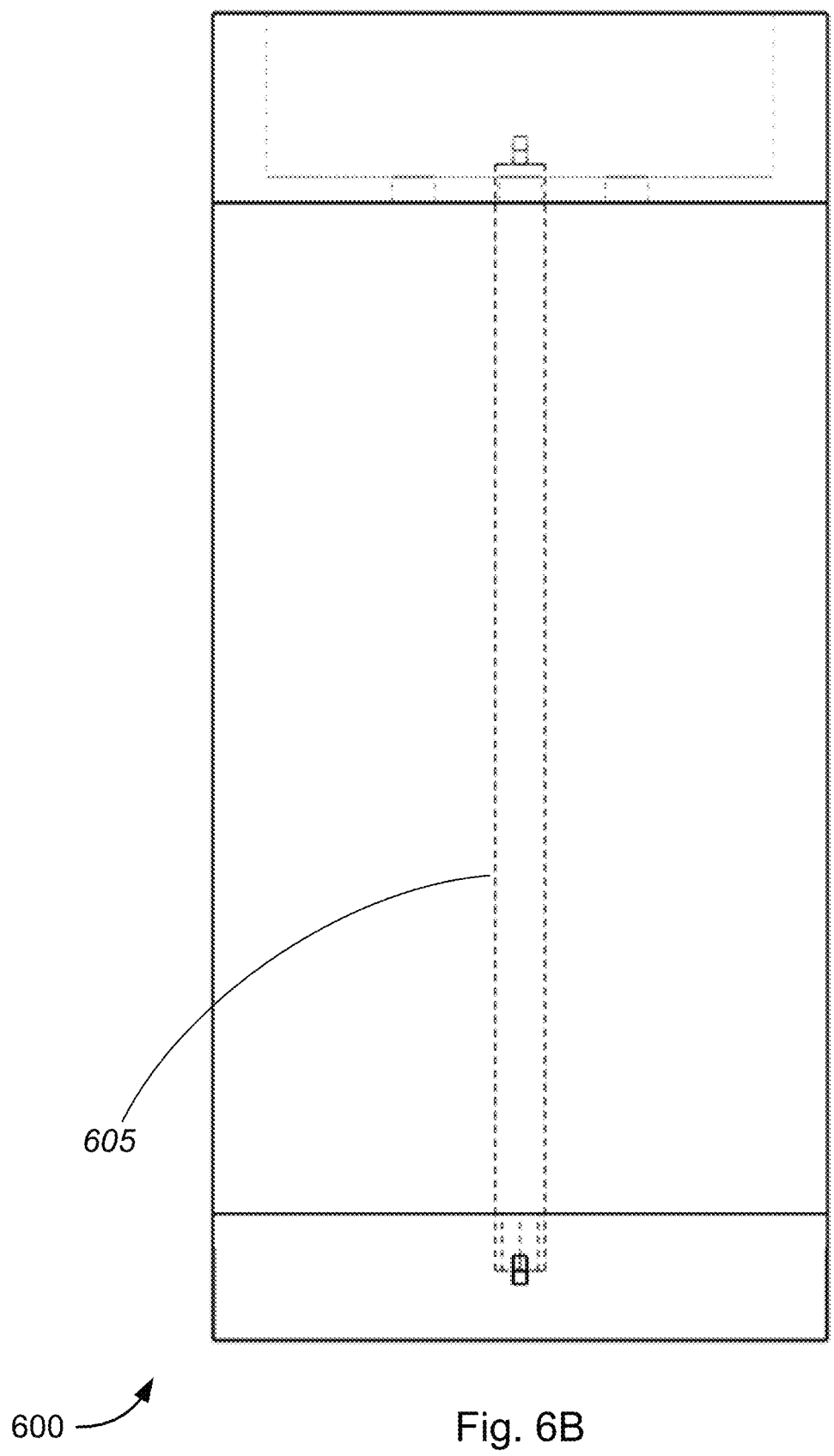
Figure 6C:
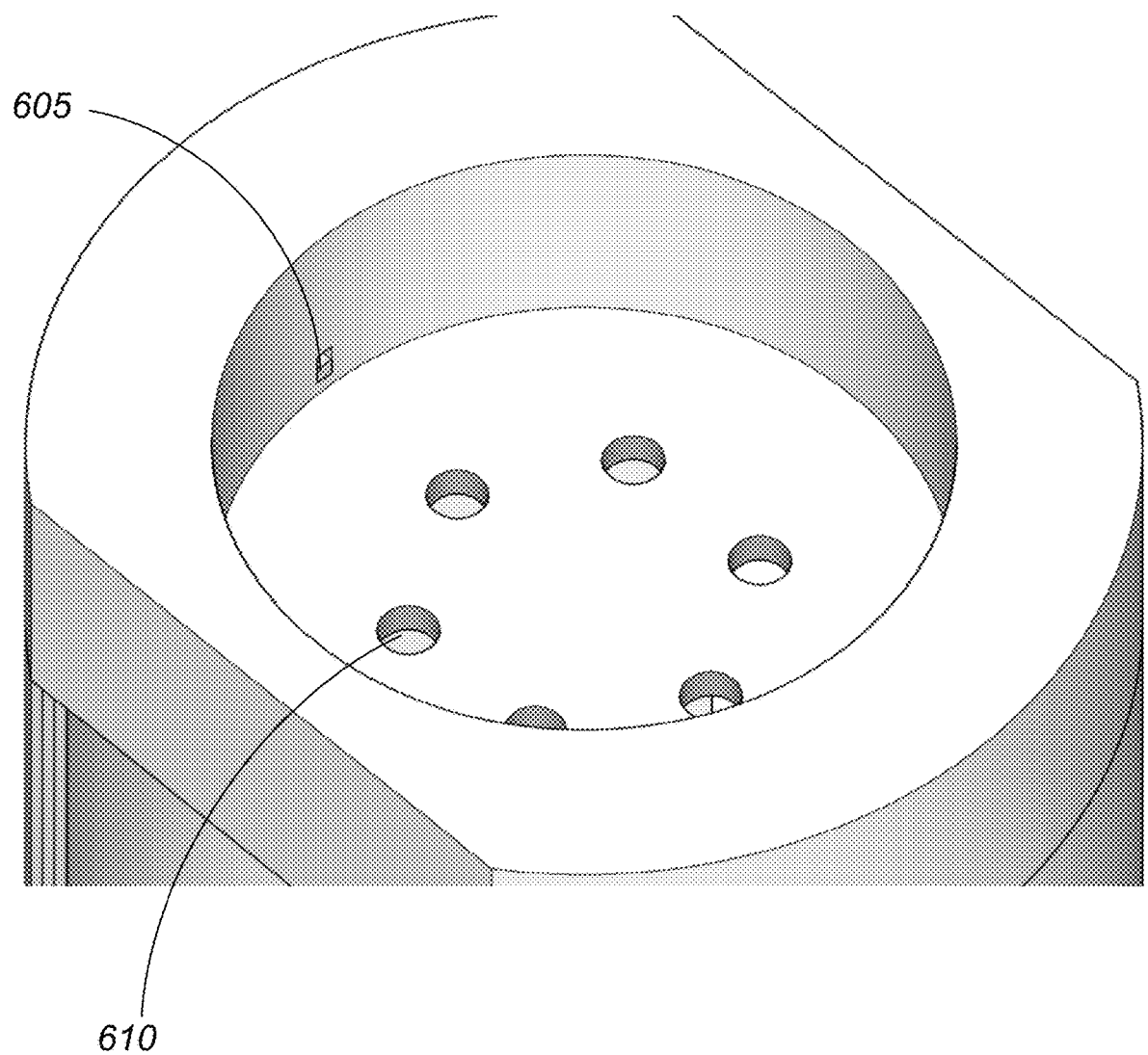

FIGS. 6A-6C (collectively, FIG. 6) are schematic diagram of a connector 600 of a lighting element, in accordance with various embodiments. FIG. 6A represents a front view of connector 600. FIG. 6B represents a side view of connector 600. FIG. 6C represent a top perspective view of connector 600. The connector 600 might be configured to provide an electrical connection directly to a light source via a conductive element 605 or indirectly to the light source through one or more intermediary components of the light source connected to the conductive element 605.

As shown in FIG. 6, the connector 600 is a base for a lighting element. However, the connector 600 does not necessarily need to be a base for a lighting element. The connector 600 could be a base of the lighting element, a cover (e.g., cover 100 of FIG. 1, the cover 200 of FIG. 2, the cover 310 of FIG. 3, the cover 400 of FIG. 4, and/or the cover 500 of FIG. 5) of the lighting element, a mount for the lighting element, a suspended mount (e.g., a mount to suspend a lighting element from a ceiling or a wall) for the lighting element, a wall mount for the lighting element, a side fixture of the lighting element, a housing for the lighting element, a stand for the lighting element, and/or any other connector or component configured to provide an electrical connection to the light source or an intermediary component of the light source. The intermediary component of the light source might include another light source, a control unit, a power supply, a ballast, a driver, a switch, a wire, and/or one or more other electrical components capable of providing an electrical connection to the light source.

The connector 600 may be configured to attach to the cover 100 of FIG. 1, the cover 200 of FIG. 2, the cover 310 of FIG. 3, the cover 400 of FIG. 4, and/or the cover 500 of FIG. 5. Alternatively, the connector 600 may be used independently of the cover 100 of FIG. 1, the cover 200 of FIG. 2, the cover 310 of FIG. 3, the cover 400 of FIG. 4, and/or the cover 500 of FIG. 5. It should be noted that the various components of connector 600 are schematically illustrated in FIG. 6, and that modifications to the various components and other arrangements of connector 600 may be possible and in accordance with the various embodiments.

The connector 600 of FIG. 6 might be a connector for a light element or lighting element (e.g., a light, a lightbulb, a light fixture, a light element, a luminaire, and/or any other type of light source, and/or the like) or a cover of a lighting element. In some cases, the connector 600 might be formed via 3D printing.

Turning to FIG. 6B, the connector 600 might include conductive element 605 contained within connector 600. The conductive element 605 might be a wire, a cable, a filament, or similar structure capable of conducting electricity. The conductive element might be formed from metal (e.g., copper, and/or the like) or other conductive material.

The conductive element 605 might be formed inside the connector 600 as the connector 600 is formed. In a non-limiting example, as the connector 600 is 3D printed, the conductive element 605 might also be 3D printed within the material of the connector 600. For example, in order to form the conductive element 605 within connector 600, a 3D printer may form one or more layers of material. In one or more selected locations of the connector 600, the 3D printer would switch to a conductive material to form the conductive element 605. Similar methods may be used to form conductive element 605 within other parts of a lighting element (e.g., the cover 100 of FIG. 1, the cover 200 of FIG. 2, the cover 310 of FIG. 3, the cover 400 of FIG. 4, and/or the cover 500 of FIG. 5, and/or the like).

In some instances, the connector 600 might be formed from a translucent or transparent material such that the conductive element 605 is visible to the human eye. Alternatively, the connector 600 might be formed in an opaque or non-transparent material such that the conductive element 605 is invisible to the human eye.

Turning to FIG. 6C, the connector 600 might include one or more electrical connections 610 for a light source (e.g., light, a lightbulb, a light emitting diode, a fluorescent light, an incandescent light, a halogen light, or any other source capable of emitting light, and/or the like). The one or more electrical connections 610 might be electrically connected to the conductive element 605 contained within connector 600.

The conductive element 605 and the electrical connections 610 may be integral to the electronics of a lighting element allowing electricity to be passed through the connector 600 of the lighting element via the conductive element 605 and the electrical connections 610. By including the conductive element 605 within the connector 600, there are no visible wires leading to a light source.

Figure 7:
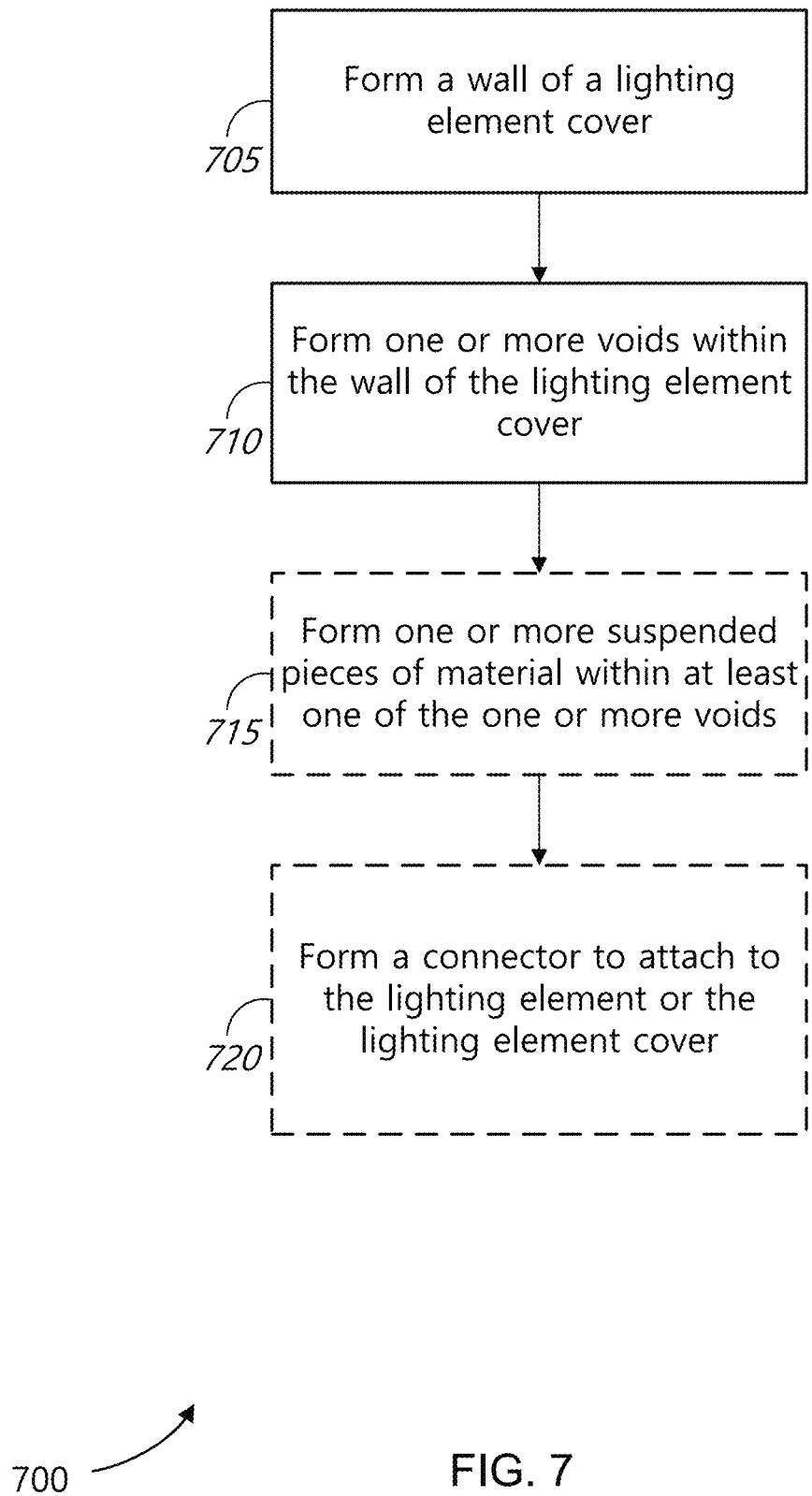
FIG. 7 is a flow diagram of a method of manufacturing a lighting element or a lighting fixture, in accordance with various embodiments.

FIG. 7 is a flow diagram of a method 700 of manufacturing a lighting element, in accordance with various embodiments. The method 700 includes, at block 705, forming a wall of a lighting element cover. As previously described, the cover might be a cover, shade, or housing for a light element or lighting element (e.g., a light, a lightbulb, a light fixture, a light element, a luminaire, a lamp, a wall light, a night light, and/or any other type of light source, and/or the like). The cover might be formed via three-dimensional ("3D") printing. The 3D printing might include, without limitation, fused filament fabrication process ("FFF"), stereolithography ("SLA") printing, selective laser sintering ("SLS"), fused deposition modeling ("FDM"), digital light process ("DLP"), multi jet fusion ("MJF"), ceramic printing, and/or the like. The one or more materials that may be printed may include, without limitation, plastic, metal, ceramic, resin, a reflective material, a refractive material, a self-luminous material, a luminescent material, an electroluminescent material, a glow-in-the-dark material, a conductive material, and/or any other type of material capable of being 3D printed.

The method may continue onto block 710 by forming one or more voids within the wall of the lighting element cover. The one or more voids might be formed between the outer wall surface and the inner wall surface of the wall. The one or more voids may be formed bypassing, using the 3D printer, forming or depositing the material at one or more locations of the wall between the inner surface and the outer surface of the wall.

In some cases, an inner surface of the one or more voids may be formed from a different material from the cover. In a non-limiting example, an inner surface of the one or more voids may be formed from at least one of a reflective material, a refractive material, a self-luminous material, a luminescent material, an electroluminescent material, a glow-in-the-dark material, and/or the like. Additionally or alternatively, an inner surface of the one or more voids may be formed from a different color from the cover. Each of these may be used to create a different lighting effect in the cover of the lighting element.

The method 700 might then continue onto optional block 715 by forming one or more suspended structures within the one or more voids. The one or more structures might be one or more droops, one or more swoops, one or more curves, one or more drapes, and/or the like suspended within the one or more voids. The one or more structures may be formed using a 3D printer by increasing an extrusion speed for extruding the one or more structures from the 3D printer as a 3D printer nozzle traverses over the one or more voids or slowing a nozzle speed of the 3D printer nozzle as the 3D printer nozzle traverses over the one or more voids.

The method 700 might also optionally include forming a connector attached to the lighting element cover. The connector might include a conductive element extending through the connector and be configured to provide an electrical connection to a light source. The connector might be formed from plastic, metal, ceramic, resin, a reflective material, a refractive material, a self-luminous material, a luminescent material, an electroluminescent material, a glow-in-the-dark material, a conductive material, and/or any other type of material capable of being 3D printed. The conductive element might be formed from metal, a conductive material, and/or the like. In some cases, the conductive element might also be formed from a reflective material, a refractive material, a self-luminous material, a luminescent material, an electroluminescent material, a glow-in-the-dark material, and/or the like.

The techniques and processes described above with respect to various embodiments may be used to manufacture cover 100, 200, 310, 400, 500 and/or connector 600, and/or components thereof, as described herein.

Exemplary System and Hardware Implementation

Figure 8:
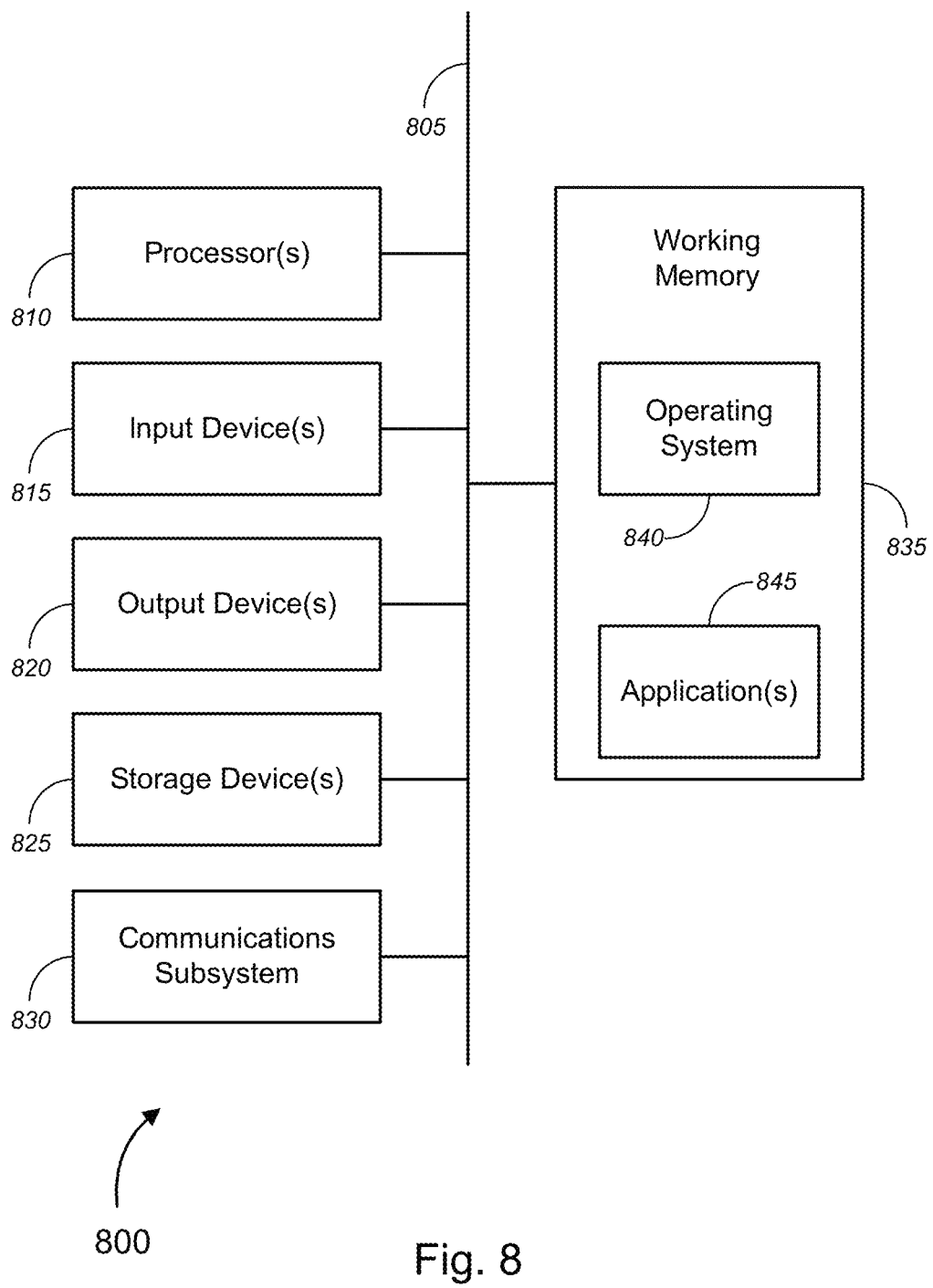
FIG. 8 is a block diagram illustrating an exemplary computer or system hardware architecture, in accordance with various embodiments.

The various implementations of FIGS. 1-7 can be implemented using computer-controlled 3D printing devices. The computer-controlled printers can be programmed to build designs to form the embodiments of FIGS. 1-7 using designs stored on one or more databases. Each of the computers and databases described herein can be implemented by the exemplary computer system illustrated in FIG. 8. FIG. 8 broadly illustrates how individual system elements can be implemented.

The computer or hardware system 800—which might represent an embodiment of the computer or hardware system of the 3D printers, described above with respect to FIGS. 1-7—is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as microprocessors, digital signal processing chips, graphics acceleration processors, and/or the like); one or more input devices 815, which can include, without limitation, a mouse, a keyboard, and/or the like; and one or more output devices 820, which can include, without limitation, a display device, a printer, and/or the like.

The computer or hardware system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 800 might also include a communications subsystem 830, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 830 may permit data to be exchanged with a network (such as the network described below, to name one example), with other computer or hardware systems, and/or with any other devices described herein. In many embodiments, the computer or hardware system 800 will further comprise a working memory 835, which can include a RAM or ROM device, as described above.

The computer or hardware system 800 also may comprise software elements, shown as being currently located within the working memory 835, including an operating system 840, device drivers, executable libraries, and/or other code, such as one or more application programs 845, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 800 and/or might take the form of source and/or installable code, which, upon compilation and/or installation on the computer or hardware system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 800) to perform methods in accordance with various embodiments of the invention. According to a set of embodiments, some or all of the procedures of such methods are performed by the computer or hardware system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire, and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a storage device 825 either before or after execution by the processor(s) 810.

Figure 9:
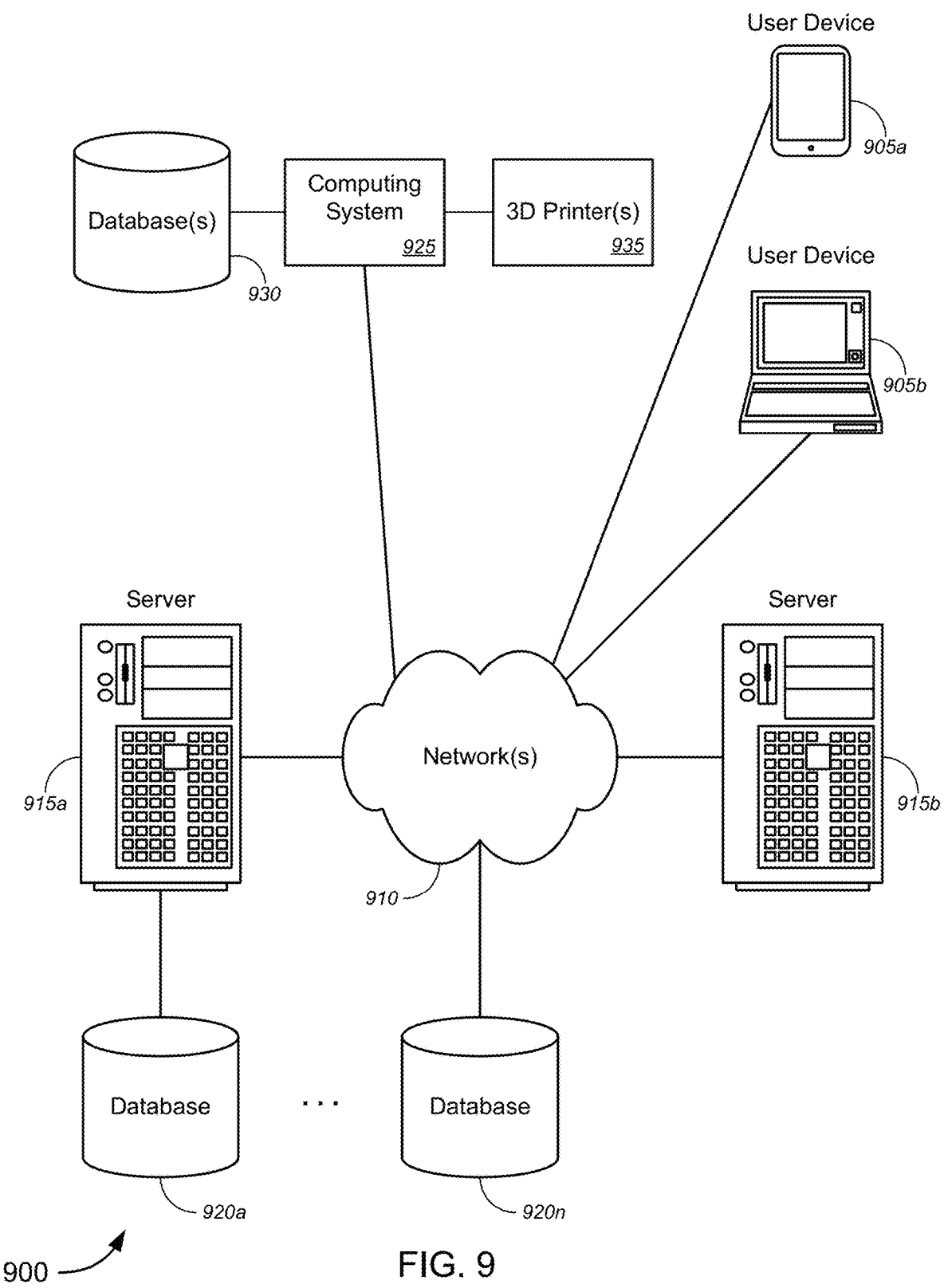
FIG. 9 is a block diagram illustrating a networked system of computers, computing systems, or system hardware architecture, which can be used in accordance with various embodiments.

As noted above, a set of embodiments comprises methods and systems for providing improved lighting components printed by 3D printers. FIG. 9 illustrates a schematic diagram of a system 900 that can be used in accordance with one set of embodiments. The system 900 can include one or more user computers, user devices, or customer devices 905. A user computer, user device, or customer device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 905 can also have any of a variety of applications, including one or more applications configured to perform methods provided by various embodiments (as described above, for example), as well as one or more office applications, database client and/or server applications, and/or web browser applications. Alternatively, a user computer, user device, or customer device 905 can be any other electronic device, such as a thin-client computer, Internet-enabled mobile telephone, and/or personal digital assistant, capable of communicating via a network (e.g., the network(s) 910 described below) and/or of displaying and navigating web pages or other types of electronic documents. Although the exemplary system 900 is shown with two user computers, user devices, or customer devices 905, any number of user computers, user devices, or customer devices can be supported.

Certain embodiments operate in a networked environment, which can include a network(s) 910. The network(s) 910 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 910 can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 915. Each of the server computers 915 may be configured with an operating system, including, without limitation, any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, a web server, a cloud computing device(s), or the like, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 905 and/or another server 915. In some embodiments, an application server can perform one or more of the processes for detecting and correcting anomalous events in real-time in finance and accounting and, more particularly, for detecting and correcting anomalous events in real-time as users enter data into a general ledger, as described in detail above. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases, a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer, user device, or customer device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920a-920n (collectively, "databases 920"). The location of each of the databases 920 is discretionary: merely by way of example, a database 920a might reside on a storage medium local to (and/or resident in) a server 915a (and/or a user computer, user device, or customer device 905). Alternatively, a database 920n can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

According to some embodiments, system 900 might further comprise a computing system 925, corresponding database(s) 930, and 3D printer(s) 935. The database(s) 930 and 3D printers 935 might be contained within computing system 925 or separate from computing system 925.

In operation, the one or more 3D printers 935 might be used to form the lighting components described in FIGS. 1-7. Additionally, the database(s) 930 might be used to store the one or more print files used by the 3D printers 935 to form the lighting components described in FIGS. 1-7.

These and other functions of the system 900 (and its components) are described in greater detail above with respect to FIGS. 1-7.

While some features and aspects have been described with respect to the embodiments, one skilled in the art will recognize that numerous modifications are possible. For example, the methods and processes described herein may be implemented using hardware components, custom integrated circuits (ICs), programmable logic, and/or any combination thereof. Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. A cover for a light source comprising:
   a body including a first end and a second end opposite the first end, the body further including an opening extending through the first end and a wall extending between the first end and the second end of the body, wherein the light source is configured to be inserted into the opening of the body; and
   the wall comprising an inner surface having two or more first stacked layers, an outer surface having two or more second stacked layers attached to the inner surface, and one or more voids located between the inner surface and the outer surface of the wall, wherein a perimeter of a first inner end of the inner surface of the wall defines the opening extending through the first end of the body.

2. The cover of claim 1, wherein a thickness of at least one of the inner surface or the outer surface varies within at least one void of the one or more voids.

3. The cover of claim 2, wherein the thickness of at least one of the inner surface or the outer surface varies within the at least one void based on at least one of varying a deposition width of a material forming at least one of the inner surface or the outer surface of the wall or varying a number of layers forming at least one of the inner surface or the outer surface of the wall.

4. The cover of claim 1, wherein at least one void of the one or more voids comprises one or more structures suspended in the at least one void of the one or more voids.

5. The cover of claim 4, wherein the one or more structures suspended in the at least one void are curved.

6. The cover of claim 1, wherein a width of at least one void of the one or more voids varies along a height of the at least one void of the one or more voids.

7. The cover of claim 1, wherein one or more first portions of the inner surface of the wall couple to one or more second portions of the outer surface of the wall between a first void of the one or more voids and a second void of the one or more voids.

8. The cover of claim 1, further comprising one or more patterns formed in the wall by at least one of varying an internal width of at least one void of the one or more voids along a height of the at least one void, varying a thickness of at least one of the inner surface or the outer surface of the at least one void, coupling one or more first portions of the inner surface of the wall to one or more second portions of the outer surface of the wall between a first void of the one or more voids and a second void of the one or more voids, or suspending one or more structures in the at least one void.

9. The cover of claim 1, wherein an interior of at least one void of the one or more voids is isolated from an outside environment.

10. The cover of claim 1, wherein at least one inner surface or outer surface of at least one void of the one or more voids is formed from at least one of a reflective material, a refractive material, or a self-luminous material, or at least one inner surface of the at least one void of the one or more voids is coated in the reflective material, the refractive material, or the self-luminous material.

11. The cover of claim 1, wherein at least one inner surface or outer surface of at least one void of the one or more voids is formed from a material having one or more first colors or coated in a coating material in the one or more first colors, and wherein the one or more first colors are different from a wall color of the wall.

12. A method of manufacturing a cover for a light source comprising:
   forming a body of the cover, the body of the cover including a first end and a second end opposite the first end, the body further including an opening extending through the first end and a wall extending between the first end and the second end of the body, wherein the light source is configured to be inserted into the opening of the body;
   wherein forming the wall of the body comprises:
      forming an inner surface of the wall having two or more first stacked layers, wherein a perimeter of a first inner end of the inner surface of the wall defines the opening extending through the first end of the body,
      forming an outer surface of the wall having two or more second stacked layers attached to the inner surface of the wall; and
      forming one or more voids between the inner surface and the outer surface of the wall.

13. The method of claim 12, wherein forming the wall comprises:
   forming, using a three-dimensional ("3D") printer, a first layer of material; and
   forming, using the three-dimensional ("3D") printer, one or more additional layers of the material on top of the first layer of the material or a preceding layer of the one or more additional layers.

14. The method of claim 13, wherein forming the one or more voids comprises:
   bypassing, using the 3D printer, forming the material at one or more locations of the one or more additional layers between the inner surface and the outer surface of the wall.

15. The method of claim 12, wherein a width of at least one void of the one or more voids varies along a height of the at least one void of the one or more voids.

16. The method of claim 15, wherein the width of at least one void of the one or more voids varies by varying a deposition width of a material forming at least one of the inner surface or the outer surface of the wall or varying a number of layers forming at least one of the inner surface or the outer surface of the wall.

17. The method of claim 12, further comprising coupling one or more first portions of the inner surface of the wall to one or more second portions of the outer surface of the wall between a first void of the one or more voids and a second void of the one or more voids.

18. The method of claim 17, wherein coupling the one or more first portions of the inner surface of the wall to the one or more second portions of the outer surface of the wall between the first void of the one or more voids and the second void of the one or more voids comprises varying a deposition width of a material forming at least one of the inner surface or the outer surface of the wall or varying a number of layers forming at least one of the inner surface or the outer surface of the wall.

19. The method of claim 12, further comprising forming one or more structures suspended in at least one void of the one or more voids.

20. The method of claim 19, wherein forming the one or more structures suspended in the one or more voids comprises:
   forming, using a three-dimensional ("3D") printer, the one or more structures in the at least one void of the one or more voids by increasing an extrusion speed for extruding the one or more structures from the 3D printer as a 3D printer nozzle traverses over the at least one void of the one or more voids or slowing a nozzle speed of the 3D printer nozzle as the 3D printer nozzle traverses over the at least one void of the one or more voids.

* * * * *